US012750490B2

(12) United States Patent
Liao et al.

(10) Patent No.: US 12,750,490 B2
(45) Date of Patent: Sep. 29, 2026

(54) METHODS AND NON-TRANSITORY COMPUTER READABLE STORAGE MEDIUM FOR PERFORMING SUBBLOCK-BASED INTERPREDICTION

(71) Applicant: Alibaba Damo (Hangzhou) Technology Co., Ltd., Hangzhou (CN)

(72) Inventors: Ru-ling Liao, Beijing (CN); Jie Chen, Beijing (CN); Yan Ye, San Diego, CA (US); Xinwei Li, Beijing (CN)

(73) Assignee: Alibaba Damo (Hangzhou) Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/487,387

(22) Filed: Oct. 16, 2023

(65) Prior Publication Data

US 2024/0146932 A1 May 2, 2024

Related U.S. Application Data

(60) Provisional application No. 63/587,190, filed on Oct. 2, 2023, provisional application No. 63/493,301, filed on Mar. 30, 2023, provisional application No. 63/477,569, filed on Dec. 29, 2022, provisional application No. 63/381,146, filed on Oct. 27, 2022.

(51) Int. Cl.
*H04N 19/137* (2014.01)
*H04N 19/105* (2014.01)
*H04N 19/176* (2014.01)
*H04N 19/70* (2014.01)

(52) U.S. Cl.
CPC ......... *H04N 19/137* (2014.11); *H04N 19/105* (2014.11); *H04N 19/176* (2014.11); *H04N 19/70* (2014.11)

(58) Field of Classification Search
None
See application file for complete search history.

(56) References Cited

U.S. PATENT DOCUMENTS

2019/0174136 A1* 6/2019 Jun ...................... H04N 19/176
2019/0320195 A1 10/2019 Lim et al.
(Continued)

FOREIGN PATENT DOCUMENTS

WO 2022140724 A1 6/2022

OTHER PUBLICATIONS

"Requirements for a Future Video Coding Standard v5," International Organisation for Standardisation, Torino, IT, 14 pages (2017).
(Continued)

*Primary Examiner* — Christopher G Findley
(74) *Attorney, Agent, or Firm* — Finnegan, Henderson, Farabow, Garrett & Dunner, LLP

(57) ABSTRACT

A video decoding method using a subblock temporal motion prediction for regular inter mode (sbAmvp mode). The method includes: receiving a bitstream comprising one or more syntax elements signaling coding unit (CU) level motion information associated with a CU, wherein the CU is encoded using regular inter mode; dividing the CU into a plurality of subblocks; and performing the sbAmvp mode on the plurality of subblocks. Performing the sbAmvp mode includes: deriving motion information for a subblock of the plurality of subblocks based on the signaled CU-level motion information.

20 Claims, 25 Drawing Sheets

(56) References Cited

U.S. PATENT DOCUMENTS

| | | | | |
|---|---|---|---|---|
| 2021/0006798 | A1 | 1/2021 | Jang | |
| 2021/0250606 | A1* | 8/2021 | Choi | H04N 19/52 |
| 2022/0124310 | A1 | 4/2022 | Kang et al. | |
| 2022/0264142 | A1 | 8/2022 | Hashimoto et al. | |
| 2024/0171732 | A1* | 5/2024 | Wang | H04N 19/577 |
| 2025/0159178 | A1* | 5/2025 | Park | H04N 19/54 |

OTHER PUBLICATIONS

Chang et al., "Compression efficiency methods beyond VVC," JVET-U0100, 21st Meeting, by teleconference, Jan. 6-15, 2021, 13 pages.

Chen et al., "Algorithm Description of Joint Exploration Test Model 7 (JEM 7)," JVET-G1001-v1, 7th Meeting: Torino, IT, Jul. 13-21, 2017, 50 pages.

Chen et al., "Algorithm description for Versatile Video Coding and Test Model 11," JVET-T2002-v2, 20th Meeting, by teleconference, Oct. 7-16, 2020, 102 pages.

Coban et al., "Algorithm description of Enhanced Compression Model 10 (ECM 10)" JVET-AE2025, 31st Meeting, Geneva, CH, Jul. 11-19, 2023, 83 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

JEM, https://jvet.hhi.fraunhofer.de/svn/svn_HMJEMSoftware.

Sullivan et al., "Overview of the High Efficiency Video Coding (HEVC) Standard," IEE Transactions on Circuits and Systems for Video Technology, vol. 22, No. 12, pp. 1649-1668 (2012).

PCT International Search Report and Written Opinion mailed Jan. 30, 2024, issued in corresponding International Application No. PCT/CN2023/126926 (6 pgs.).

Bross et al., "Chapter 5—Inter-Picture Prediction in HEVC," High Efficiency Video Coding (HEVC): Algorithms and Architectures, pp. 113-140, 2014.

Browne et al., "Algorithm description for Versatile Video Coding and Test Model 17 (VTM17)," 26th Meeting, by teleconference, Apr. 20-29, 2022, JVET-Z2002-v1, 128 pages.

Liao et al., "Non-EE2: AMVP mode with subblock-based temporal motion vector prediction," 29th Meeting, by teleconference, Jan. 11-20, 2023, 3 pages.

European Patent Office Communication issued for Application No. 23881932.0 the Supplementary European Search Report (Art. 153(7) EPC) and the European search opinion dated Feb. 5, 2026, 9 pages.

* cited by examiner

METHODS AND NON-TRANSITORY COMPUTER READABLE STORAGE MEDIUM FOR PERFORMING SUBBLOCK-BASED INTERPREDICTION

CROSS-REFERENCE TO RELATED APPLICATIONS

The disclosure claims the benefits of priority to U.S. Provisional Application No. 63/381,146, filed on Oct. 27, 2022; U.S. Provisional Application No. 63/477,569, filed on Dec. 29, 2022; U.S. Provisional Application No. 63/493,301, filed on Mar. 30, 2023; and U.S. Provisional Application No. 63/587,190, filed on Oct. 2, 2023, all of which are incorporated herein by reference in their entireties.

TECHNICAL FIELD

The present disclosure generally relates to video processing, and more particularly, to methods and systems for performing subblock-based inter prediction.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The present disclosure provides a video decoding method using a subblock temporal motion prediction for regular inter mode (sbAmvp mode). The method includes: receiving a bitstream comprising one or more syntax elements signaling coding unit (CU) level motion information associated with a CU, wherein the CU is encoded using regular inter mode; dividing the CU into a plurality of subblocks; and performing the sbAmvp mode on the plurality of subblocks. Performing the sbAmvp mode includes: deriving motion information for a subblock of the plurality of subblocks based on the signaled CU-level motion information.

In some embodiments, a video encoding method using a subblock temporal motion prediction for regular inter mode (sbAmvp mode) is provided. The method includes: receiving a video sequence; encoding one or more pictures of the video sequence; and generating a bitstream. The encoding includes: encoding a coding unit (CU) using regular inter mode; signaling CU-level motion information associated with the CU; dividing the CU into a plurality of subblocks; and performing the sbAmvp mode on the plurality of subblocks. Performing the sbAmvp mode includes deriving motion information for a subblock of the plurality of subblocks based on the signaled CU-level motion information.

In some embodiments, a non-transitory computer readable storage medium stores a bitstream generated by operations including: encoding a coding unit (CU) using regular inter mode; signaling CU-level motion information associated with the CU; dividing the CU into a plurality of subblocks; and performing the sbAmvp mode on the plurality of subblocks. Performing the sbAmvp mode includes deriving motion information for a subblock of the plurality of subblocks based on the signaled CU-level motion information.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
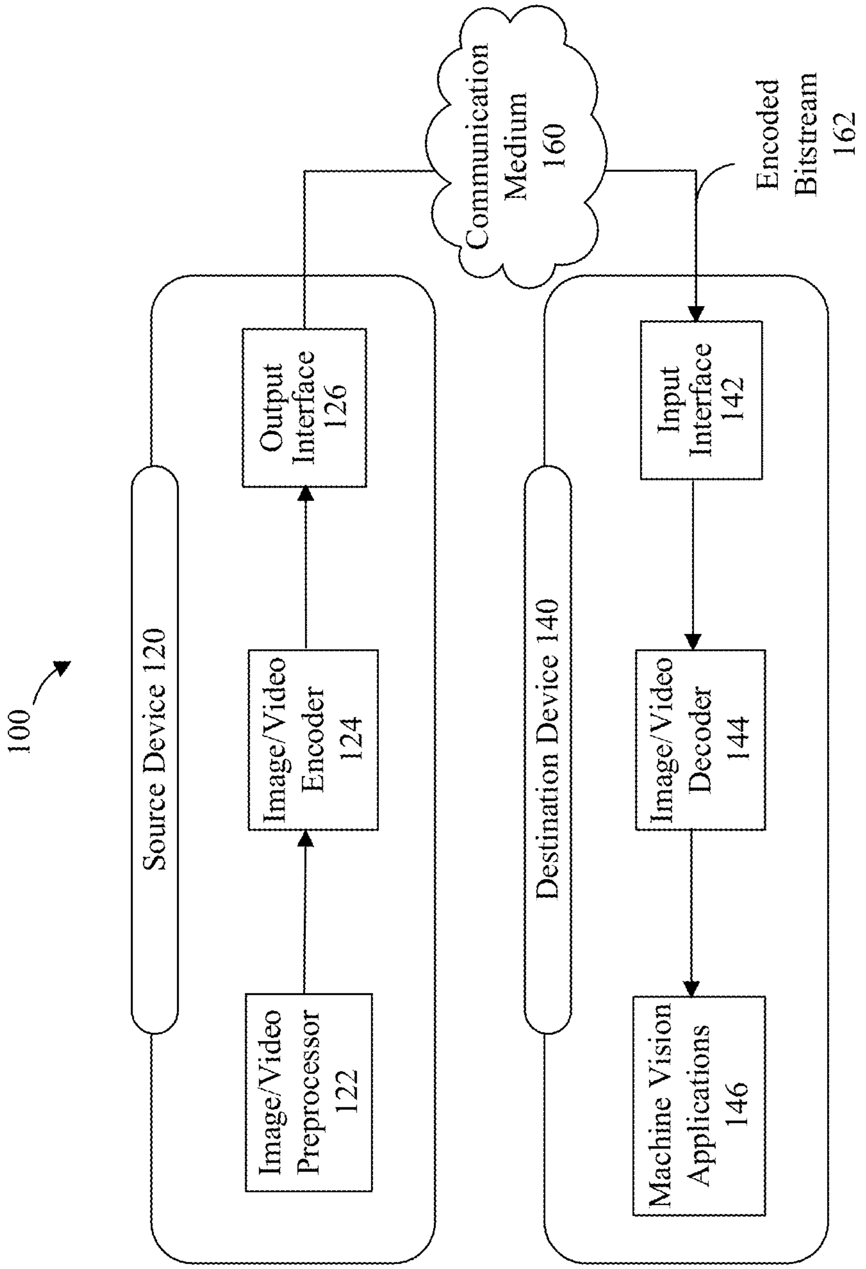
FIG. 1 is a schematic diagram illustrating an exemplary system for preprocessing and coding image data, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/video preprocessor 122 preprocesses image data, i.e., image(s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques (such as those utilized by image/video encoder 124 and image/video decoder 144) are described in connection with FIGS. 2A-2B and FIGS. 3A-3B.

Figure 2A:
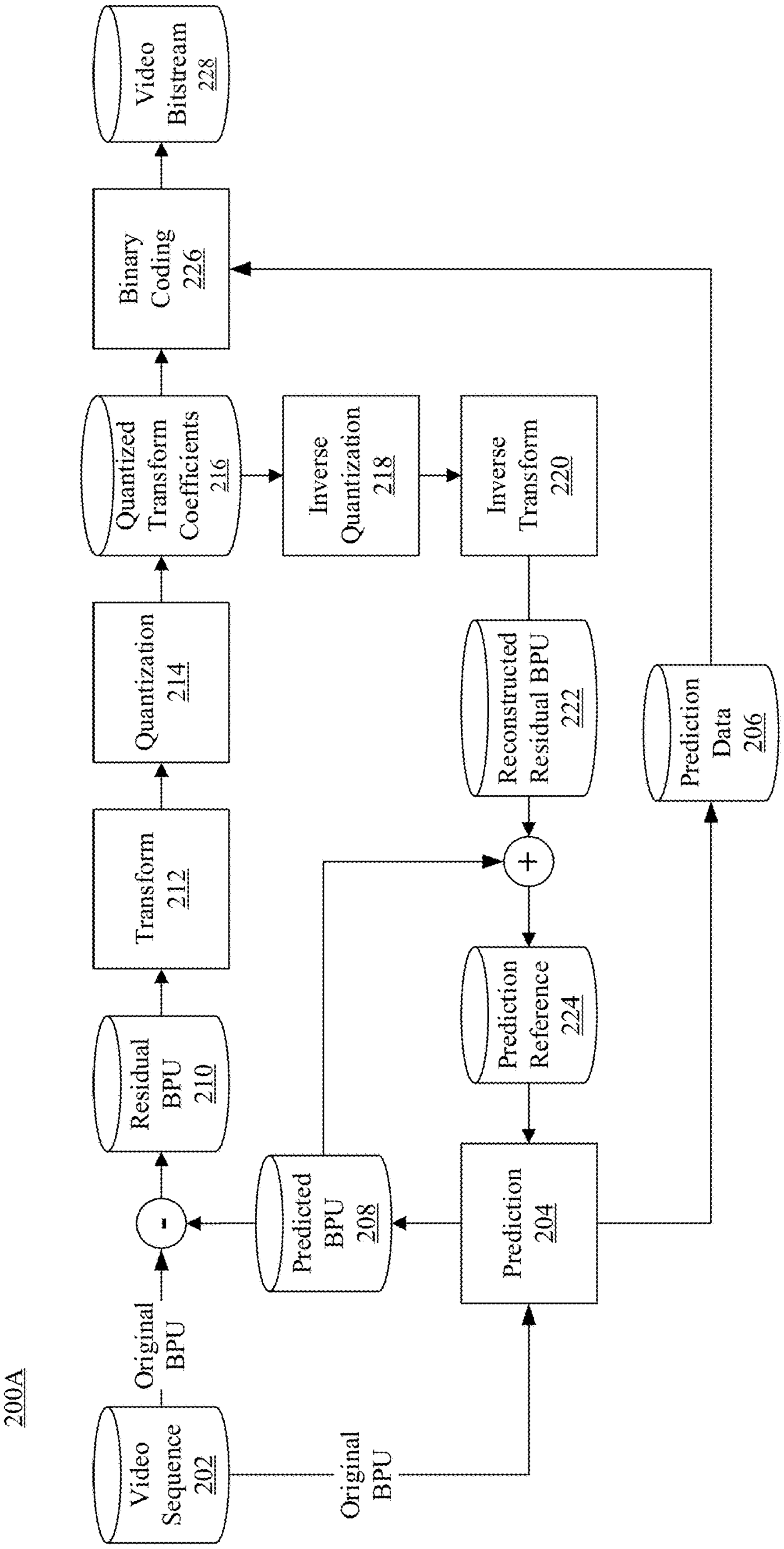
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
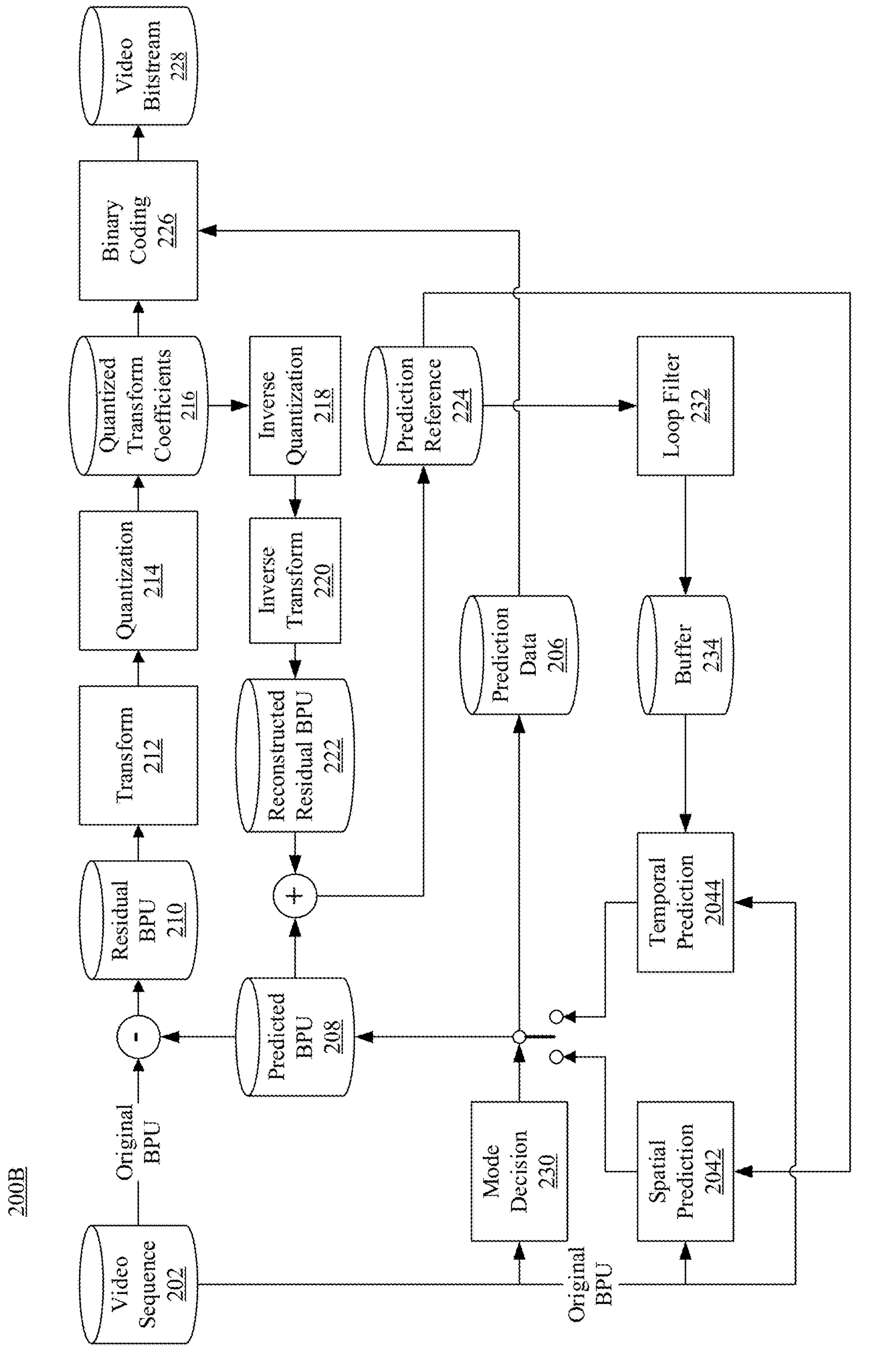
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed image as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
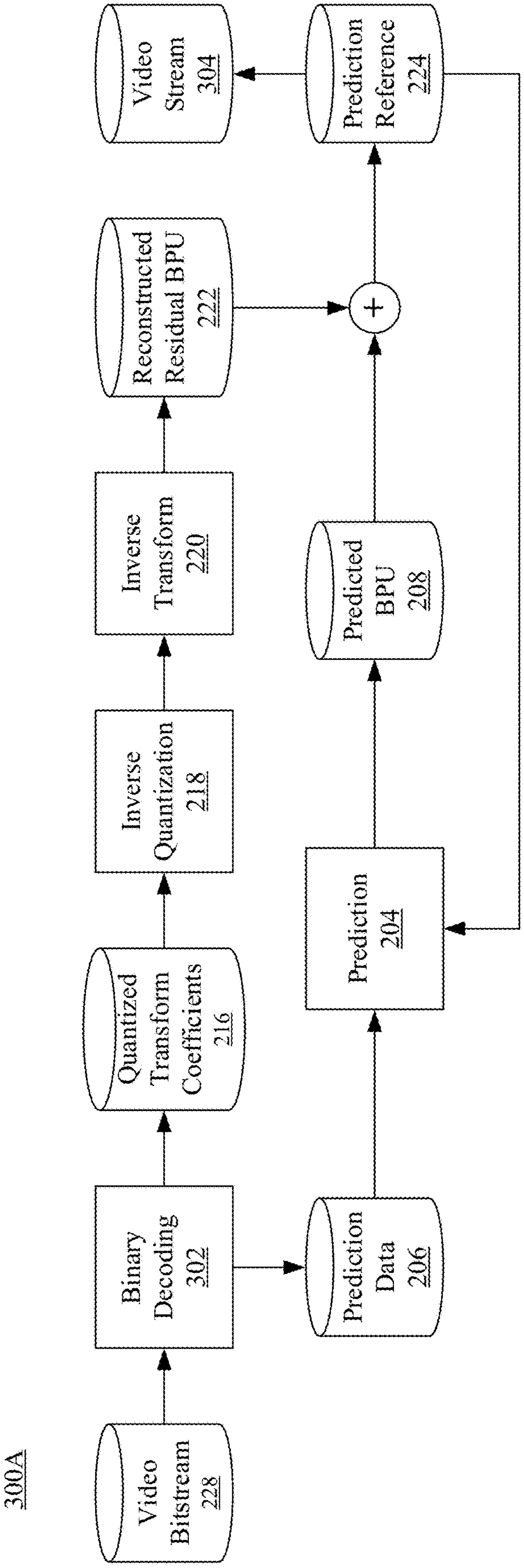
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
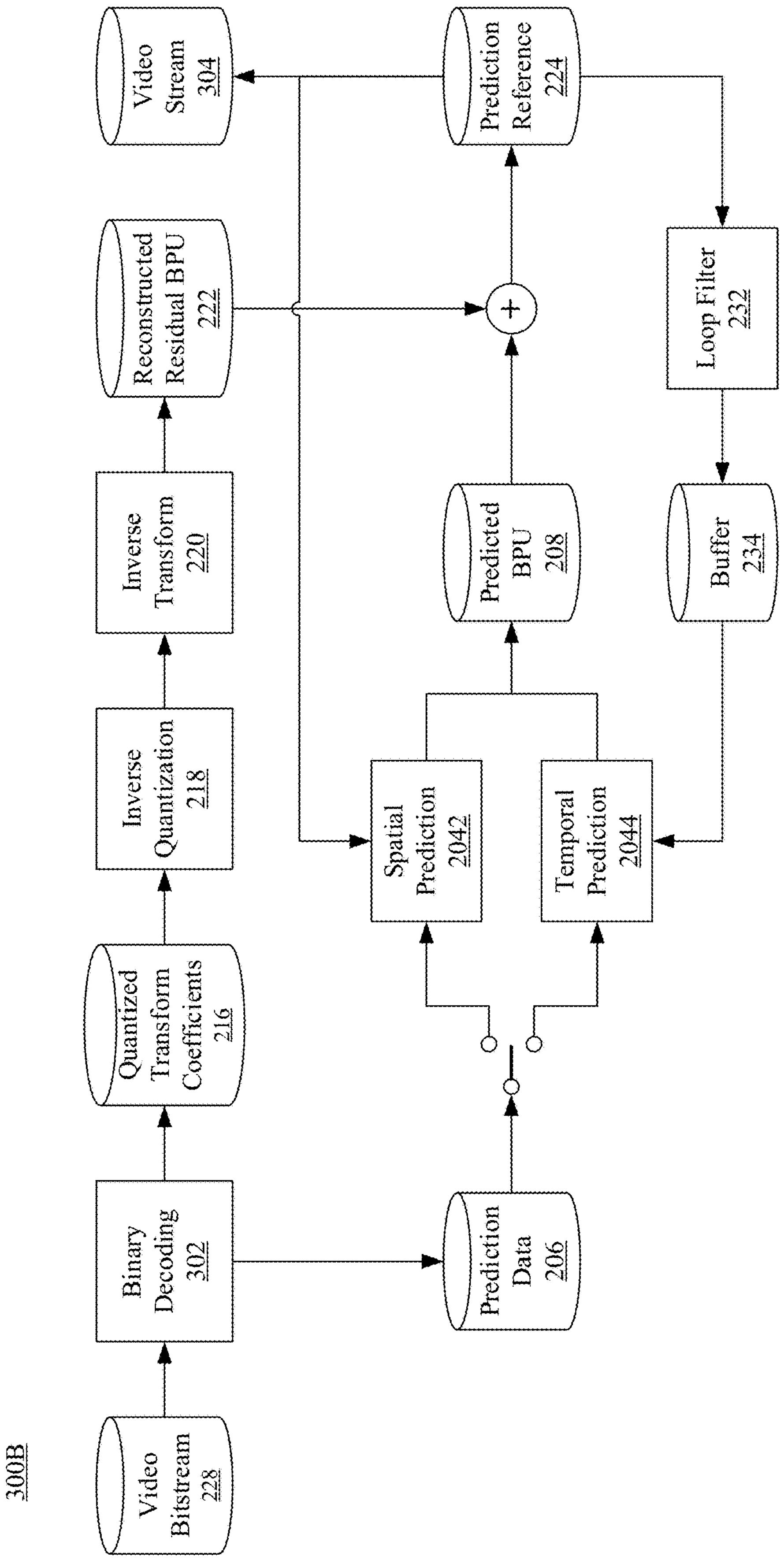
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
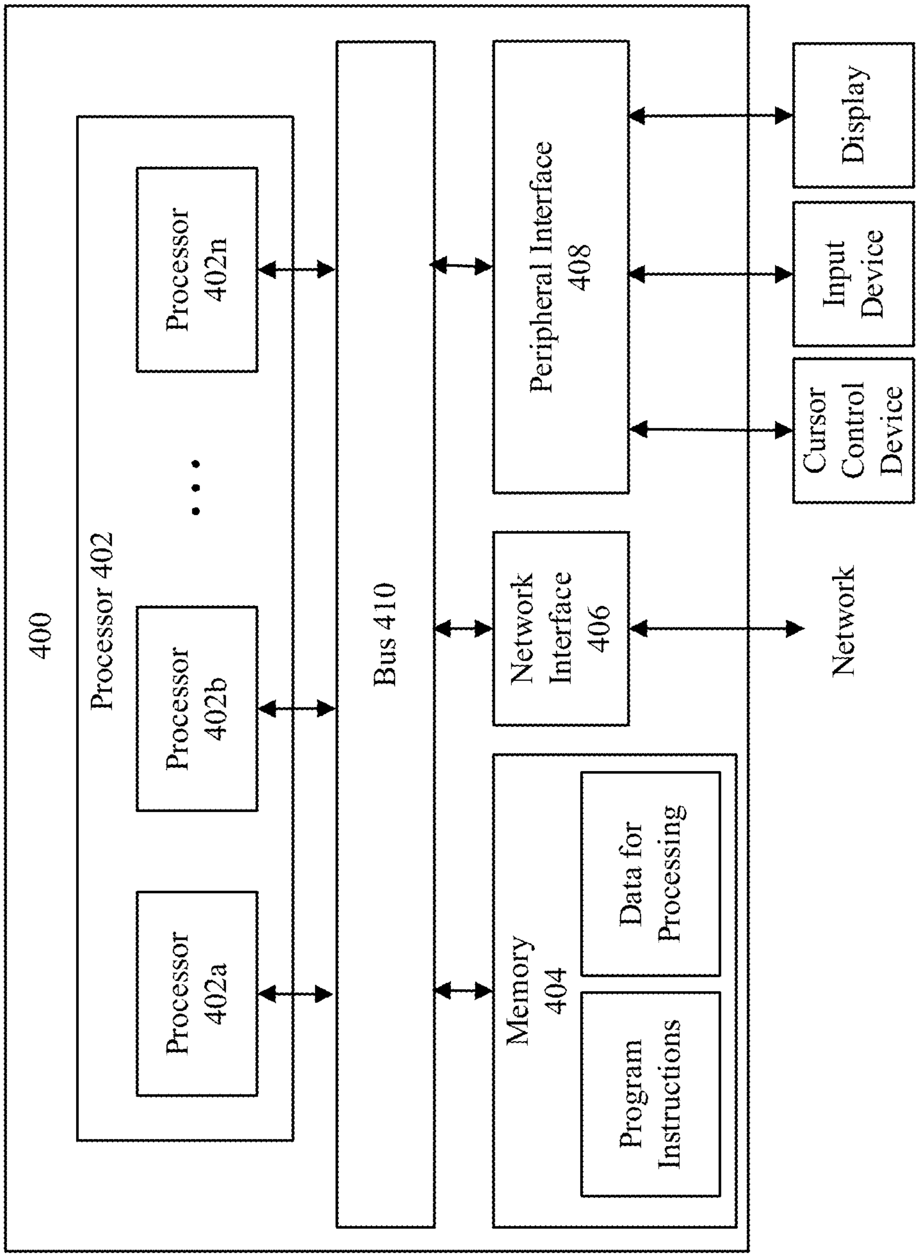
FIG. 4 is a block diagram of an exemplary apparatus for preprocessing or coding image data, according to some embodiments of the present disclosure.

Referring back to FIG. 1, each image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402*a*, processor 402*b*, and processor 402*n*.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Figure 5:
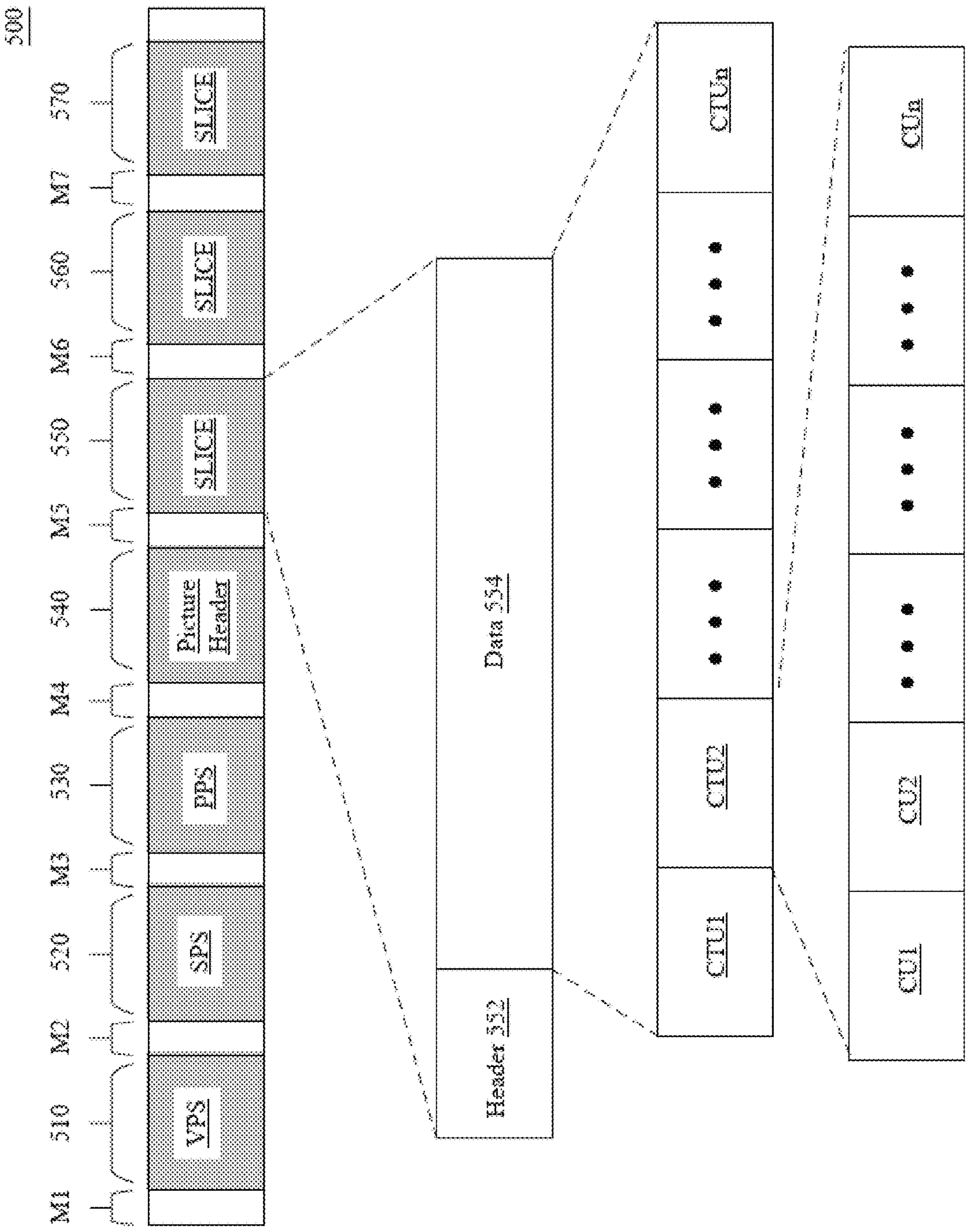
FIG. 5 is a schematic diagram illustrating a bitstream structure, according to some embodiments of the present disclosure.

FIG. 5 is a schematic diagram illustrating a bitstream structure, according to some embodiments of the present disclosure. In some embodiments, the structure of bitstream 500 can be applied for video bitstream 162 shown in FIG. 1. In FIG. 5, bitstream 500 includes a Video Parameter Set (VPS) 510, a Sequence Parameter Set (SPS) 520, a Picture Parameter Set (PPS) 530, a Picture Header 540, Slices 550-570, which are separated by synchronization markers M1-M7. Slices 550-570 each include corresponding header blocks (e.g., header 552) and data blocks (e.g., data 554), each data block including one or more CTUs (e.g., CTU1-CTUn in data 554). Moreover, each CTU further includes a plurality of CUs (e.g., CUI-CUn in FIG. 5).

According to some embodiments, bitstream 500, which is a sequence of bits in form of network abstraction layer (NAL) unit or byte stream, forms one or more coded video sequences (CVS). A CVS includes one or more coded layer video sequences (CLVS). In some embodiments, a CLVS is a sequence of picture units (PUs) and each PU contains one coded picture. Particularly, a PU includes zero or one picture header NAL unit (e.g., Picture Header 540) which contains picture header syntax structure as payload, one coded picture which includes one or more video coding layer (VCL) NAL units. Optionally, one or more other non-VCL NAL units. A VCL NAL unit is a collective term for coded slice NAL units (e.g., Slices 550-570) and the subset of NAL units that have reserved values of NAL unit type that are classified as VCL NAL units in some embodiments. A coded slice NAL unit contains a slice header and a slice data block (e.g., header 552 and data 554).

In some embodiments of the present disclosure, a layer can be a set of video coding layer (VCL) NAL units having a particular value of NAL layer ID and associated non-VCL NAL unit(s). Among these layers, inter-layer prediction may be applied between different layers to achieve high compression performance.

As explained above, in the Versatile Video Coding (e.g., VVC/H.266) standard, a picture can be partitioned into a set of CTUs, each of which is further partitioned into coding units (CUs) using quad-tree, binary tree, or ternary tree. Multiple CTUs can form a tile, a slice, or a subpicture. When a picture includes three sample arrays for storing three color components (e.g., a luma component and two chroma components), a CTU can include N×N (N being an integer) blocks of luma samples, each block of luma sample being associated with two blocks of chroma samples. In some embodiments, an Output Layer Set (OLS) can be specified to support decoding some but not all the layers. The OLS is a set of layers including a specified set of layers where one or more layers in the set of layers are specified to be output layers. Therefore, an OLS can contain one or more output layers and other layers needed to decode the output layer(s) for inter-layer prediction.

An Enhanced Compression Model (ECM) has been proposed and been used as a new software base for developing tools beyond the VVC standard.

Figure 6:
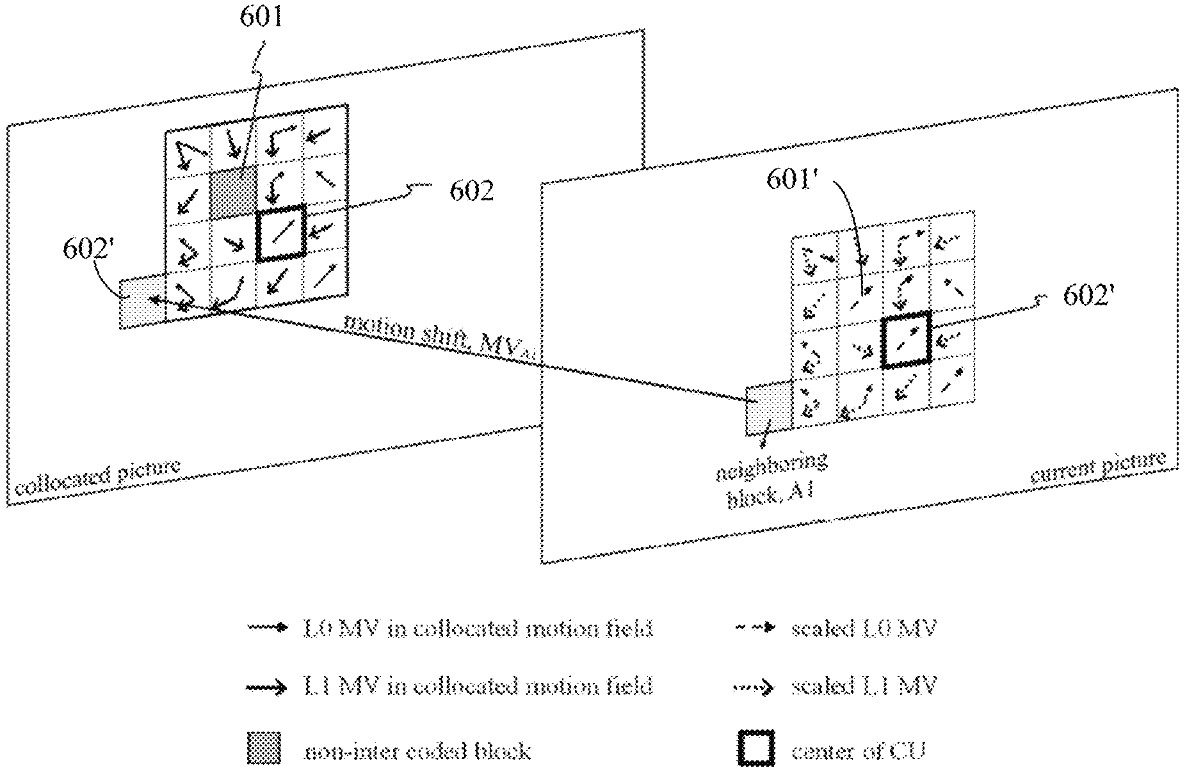
FIG. 6 is a schematic diagram illustrating an exemplary process for deriving motion vectors for subblocks in a subblock-based temporal motion vector prediction (SbTMVP) mode, according to some embodiments of the present disclosure.

In ECM, a mode called subblock-based temporal motion vector prediction (SbTMVP) is supported. In the SbTMVP mode, a CU is split into 4×4 subblocks and each subblock obtains its own motion vector from the motion field in the collocated picture. When obtaining motion vector for each subblock, a motion shift that is derived using the motion vector of the bottom-left neighboring blocks of the CU is applied. FIG. 6 is a schematic diagram illustrating an exemplary process for deriving motion vectors for subblocks in a subblock-based temporal motion vector prediction (SbTMVP) mode, according to some embodiments of the present disclosure. As shown in FIG. 6, a motion shift $MV_{A1}$ is obtained from neighboring block A1 of the CU in a current picture, and is used to derive a motion field in the collocated picture. For each subblock, the motion information of its corresponding subblock in the collocated picture is used to derive the motion information of the subblock in the current picture. After the motion information of a collocated subblock 602 is identified, it is converted to the motion vectors and reference indices of the current subblock 602'. The reference index of the subblock is selected from any one of reference pictures in a reference picture list. The selected reference picture is the one whose scaling factor is the closest to 1. A temporal motion scaling is applied after the reference index is identified. It is noted that when the corresponding subblock in the collocated picture is non-inter coded such as intra coded or intra block copy (IBC) coded, the motion information of the center subblock of the CU is used. As shown in FIG. 6, a corresponding subblock 601 is non-inter coded, that is, the subblock 601 does not contain any motion information. Thus, the motion information of the center subblock 602 is used. As a result, the motion information of a subblock 601' in the current picture corresponding to the subblock 601 is set as the same as the motion information of subblock 602' that corresponds to subblock 602 in the collocated picture.

Figure 7:
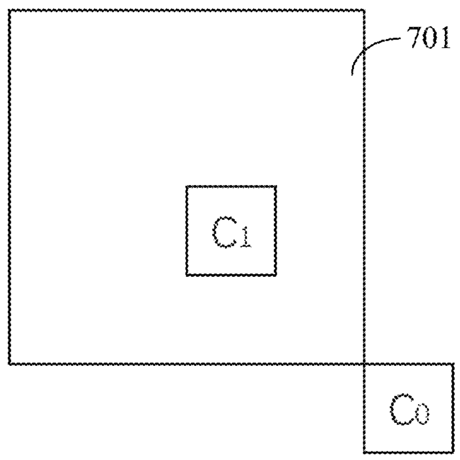
FIG. 7 illustrates collocated blocks used for temporal motion, according to some embodiments of the present disclosure.

In VVC, temporal motion is used as one of candidates for merge mode and Advanced Motion Vector Prediction (AMVP) mode. FIG. 7 illustrates collocated blocks used for temporal motion, according to some embodiments of the present disclosure. As shown in FIG. 7, the temporal motion is derived from a collocated picture and is obtained from bottom-right $C_0$ or center $C_1$ of the collocated block 701. Normally, only one collocated picture is allowed in VVC. This collocated picture is selected at encoder and is signaled in picture and slice header in the bitstream.

In ECM, to further improve the prediction accuracy of temporal motion, another collocated picture is introduced. Two collocated pictures are utilized which are the two reference frames with the least picture order count (POC) different relative to the to-be-coded frame.

In ECM, the reference picture list for each block is reordered according to template matching (TM) cost. For a uni-predicted block, all the reference pictures in the reference picture list 0 and reference picture list 1 are interweaved to generate a joint list. Then, the TM cost is calculated for each reference picture. The joint list is reordered based on ascending order of the TM cost. For a bi-predicted block, a list of pairs of reference pictures from list 0 and list 1 is generated and similarly reordered based on the TM cost. The index of the selected pair is signaled.

Figure 8:
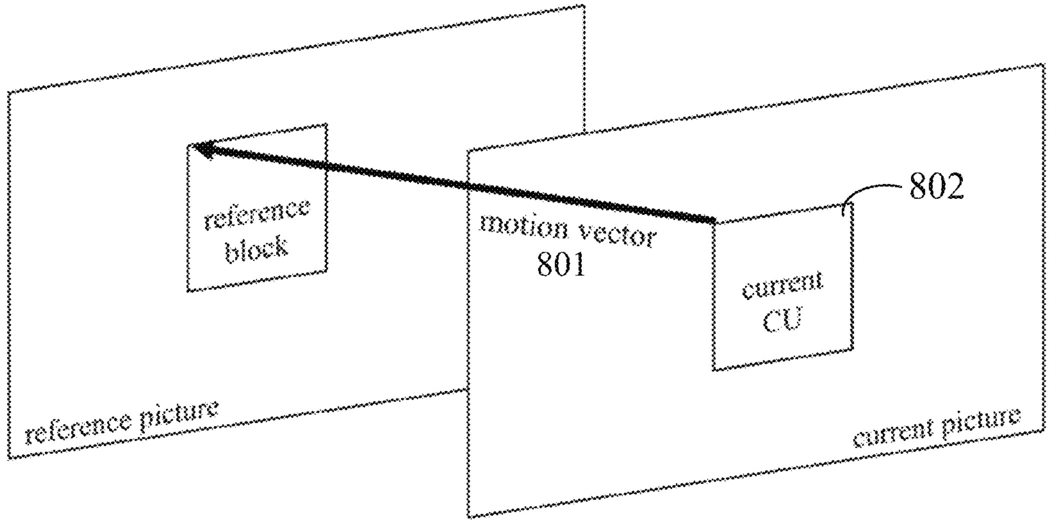
FIG. 8 is a schematic diagram illustrating an example of regular inter prediction, according to some embodiments of the present disclosure.

In the current design, the sbTMVP is only allowed in merge mode. However, it cannot be applied to the regular inter mode, which is allowed to signal motion vector difference. Thus, the benefits of using temporal motion in subblocks cannot be fully utilized. FIG. 8 is a schematic diagram illustrating an example of regular inter prediction, according to some embodiments of the present disclosure. As shown in FIG. 8, in regular inter mode, the motion vector 801 is used to predict the whole CU 802, and the CU 802 is not split into subblocks.

In the present disclosure, a subblock temporal motion prediction for regular inter mode (hereinafter referred to as a sbAmvp mode) is proposed.

Figure 9:
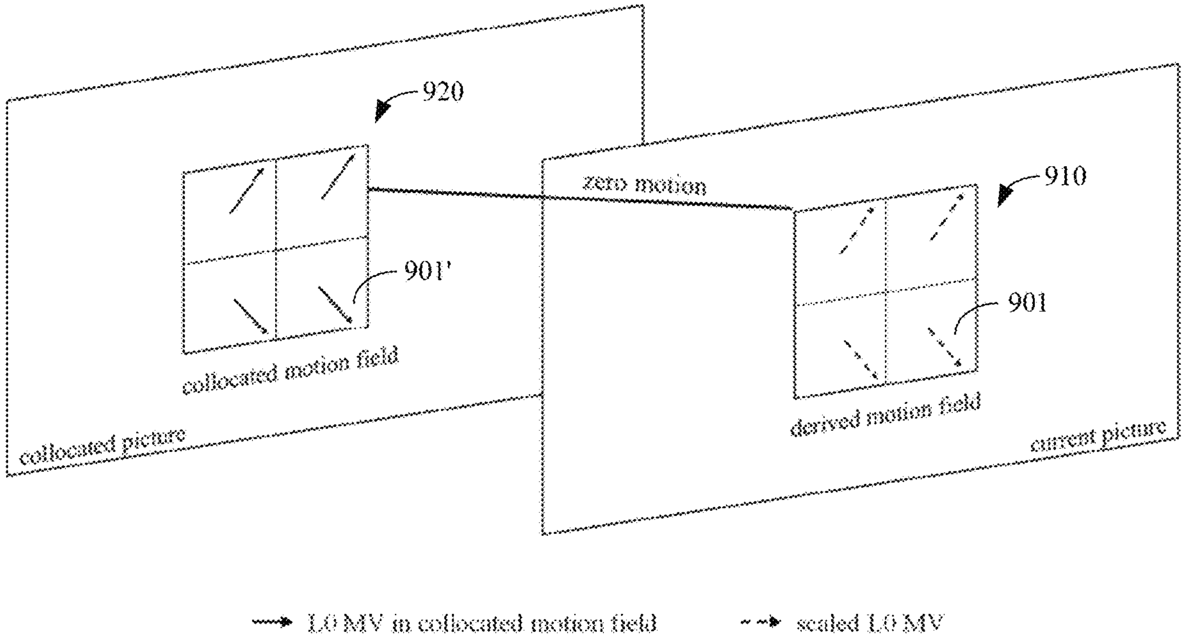
FIG. 9 is a schematic diagram illustrating an example of subblocks in a coding unit (CU), according to some embodiments of the present disclosure.
Figure 10:
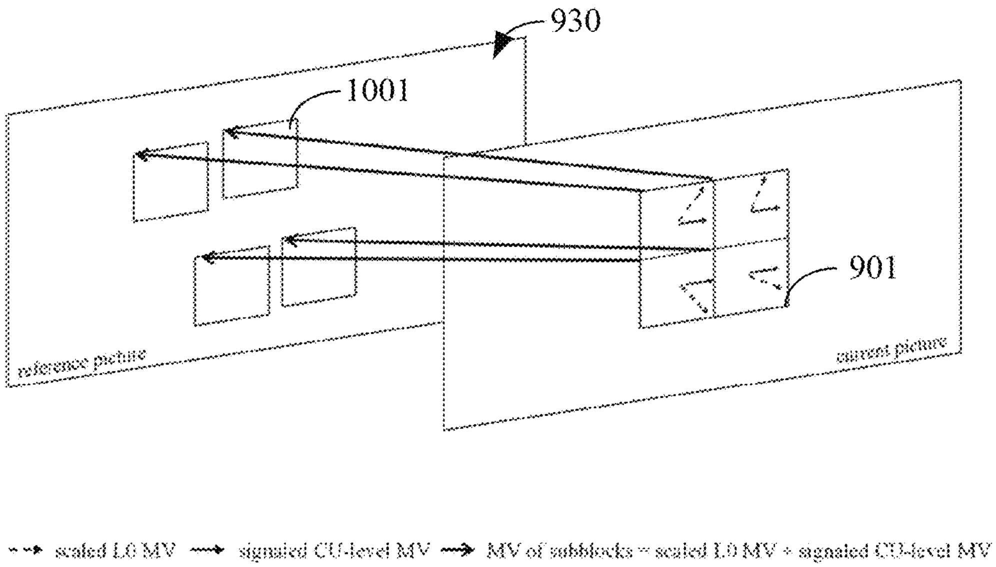
FIG. 10 is a schematic diagram illustrating an example of motion derivation for a subblock, according to some embodiments of the present disclosure.

According to some embodiments, temporal motion information associated with the subblocks can be obtained from a collocated block. Specifically, a CU is predicted with subblock temporal motion and a signaled motion. FIG. 9 is a schematic diagram illustrating an example of subblocks in a CU, according to some embodiments of the present disclosure. FIG. 10 is a schematic diagram illustrating an example of motion derivation for a subblock, according to some embodiments of the present disclosure. Referring to FIG. 9 and FIG. 10, a CU 910 is split into a plurality of subblocks. Each subblock in current CU 910 derives its motion information from a collocated block 920 and a signaled CU-level motion information. For a subblock 901, its corresponding collocated subblock 901' is firstly identified. Then, the motion information of the corresponding collocated subblock (hereinafter referred as collocated motion) is scaled to a reference picture 930 (shown in FIG. 10). The scaled motion is added to the signaled CU-level motion, and is used as motion for subblock 901. It is noted that the reference picture of each subblock may be different from or the same as each other, and the signaled CU-level motion information may contain any subset of {inter prediction direction (hereinafter referred as interDir), reference picture index (hereinafter referred as refIdx), motion vector predictor (hereinafter referred as MVP), motion vector differences (hereinafter referred as MVD).

Figure 11:
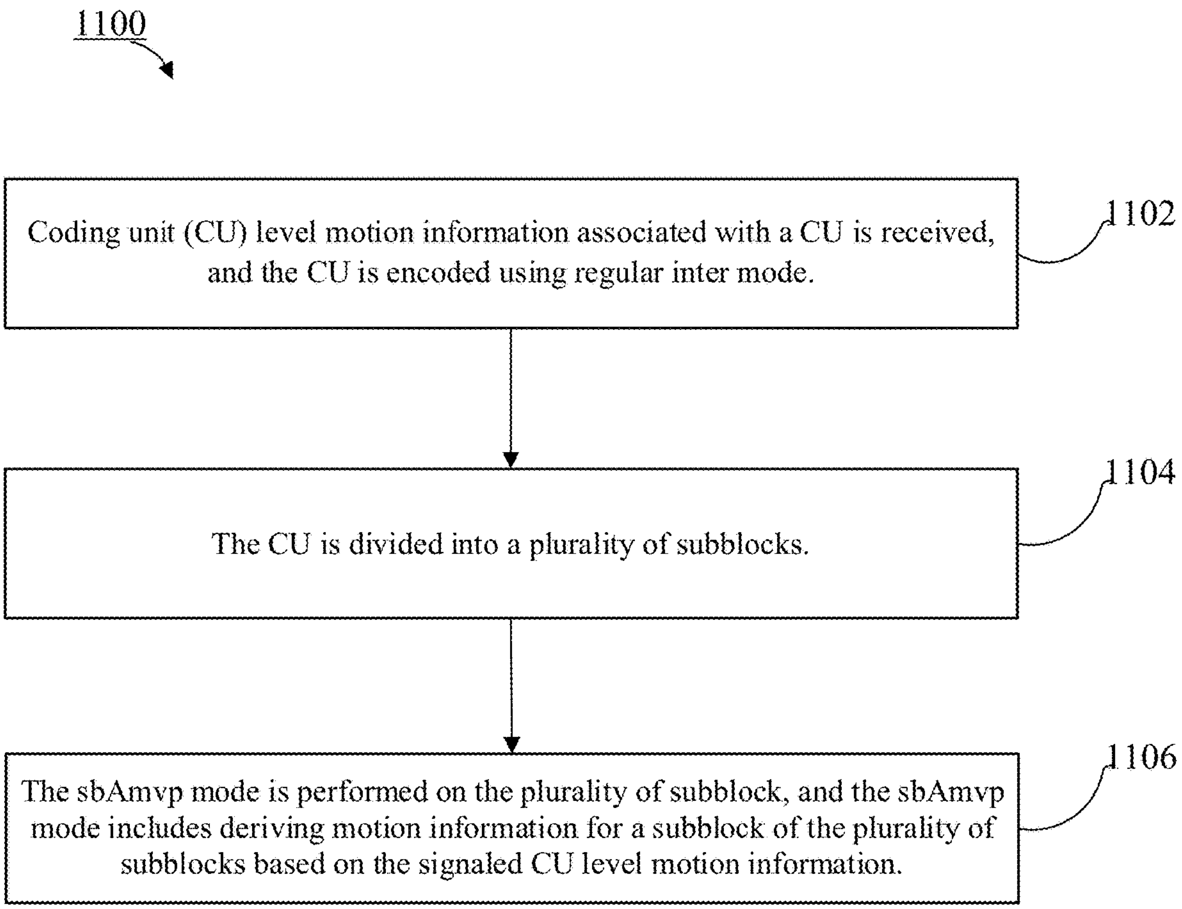
FIG. 11 illustrates a flow chart showing an example method using a subblock temporal motion prediction for regular inter mode (sbAmvp mode), according to some embodiments of the present disclosure.

FIG. 11 illustrates a flow chart showing an example method 1100 using a subblock temporal motion prediction for regular inter mode (sbAmvp mode), according to some embodiments of the present disclosure. Method 1100 can be performed by a decoder (e.g., by process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 1100. In some embodiments, method 1100 can be implemented by a computer program product, embodied in a computer-readable medium, including computer-executable instructions, such as program code, executed by computers (e.g., apparatus 400 of FIG. 4). Referring to FIG. 11, method 1100 may include the following steps 1102 to 1106.

At step 1102, coding unit (CU) level motion information associated with a CU is received. The CU is encoded using regular inter mode.

At step 1104, the CU is divided into a plurality of subblocks. For example, a CU is divided into 4×4 subblocks.

At step 1106, the sbAmvp mode is performed on the plurality of subblocks. Performing the sbAmvp mode includes deriving motion information for a subblock of the plurality of subblocks based on the signaled CU-level motion information. The signaled CU-level motion information may contain any subset of {inter prediction direction (hereinafter referred as interDir), reference picture index (hereinafter referred as refIdx), motion vector predictor (hereinafter referred as MVP), motion vector differences (hereinafter referred as MVD).

In the present disclosure, several examples are provided below for deriving the temporal motion information associated with the subblocks from a collocated block. The collocated block is in a collocate picture.

Figure 12:
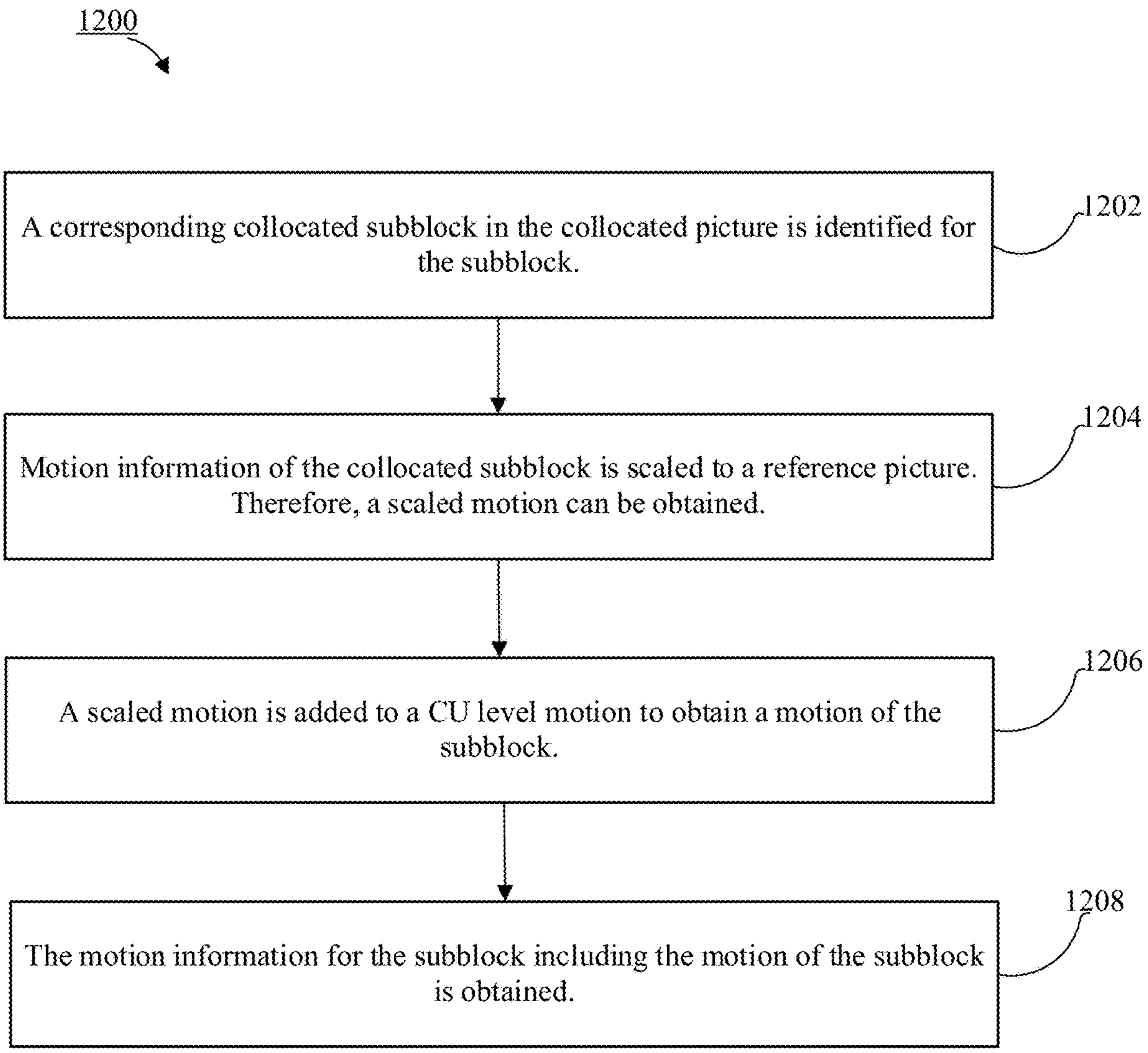
FIG. 12 illustrates a flow chart showing an example method for performing the sbAmvp mode based on a collocated block, according to some embodiments of the present disclosure.

FIG. 12 illustrates a flow chart showing an example method 1200 for performing the sbAmvp mode based on a collocated block, according to some embodiments of the present disclosure. Method 1200 can be performed by a decoder (e.g., by process 300A of FIG. 3A or 300B of FIG. 31B) or performed by one or more software or hardware components of an apparatus (e.g., apparatus 400 of FIG. 4). For example, a processor (e.g., processor 402 of FIG. 4) can perform method 1200. In some embodiments, method 1200 can be implemented by a computer program product, embodied in a computer-readable medium, including computer-executable instructions, such as program code, executed by computers (e.g., apparatus 400 of FIG. 4). Referring to FIG. 12, method 1200 may include the following steps 1202 to 1206.

At step 1202, a corresponding collocated subblock in the collocated picture is identified for the subblock.

At step 1204, motion information of the collocated subblock is scaled to a reference picture. Therefore, a scaled motion can be obtained.

At step 1206, a scaled motion is added to a CU-level motion to obtain a motion of the subblock.

At step 1208, the motion information for the subblock including the motion of the subblock is obtained. The motion information for the subblock includes the obtained motion of subblock, identified reference picture of the subblock, and inter prediction direction inherited from a CU-level motion information.

In some embodiments, the reference picture of each subblock is the same as other subblocks. That is, the references pictures of all the plurality of subblocks are the same. In some embodiments, the reference picture of each subblock is the same as other subblocks and the signaled CU-level motion information contains interDir, refIdx, MVP and MVD. The derivation of motion information for subblocks can further include: determining a reference picture for a subblock using the refIdx of the signaled CU-level motion information; determining a CU-level motion by adding the MVD to the MVP; obtaining a scaled motion is obtained by scaling the collocated motion to the reference picture; and adding the scaled motion to the CU-level motion to obtain a subblock motion.

In some embodiments, the reference picture of each subblock is the same as other subblocks, and the signaled CU-level motion information contains interDir, MVP and MVD, and the signaled CU-level motion information is pointed to a pre-defined reference picture. The pre-defined reference picture may be a collocated reference picture. That means, the reference picture is a collocated picture. The pre-defined reference picture may also be signaled at slice-level, picture-level, PPS level or SPS level. The derivation of motion information for subblocks can further include: determining the CU-level motion by adding the MVD to the MVP; obtaining the scaled motion by scaling the collocated motion to the pre-defined reference picture; and adding the scaled motion to the CU-level motion.

In some embodiments, when the signaled CU-level motion information does not contain MVD, the CU-level motion vector is set to motion vector predictor. For example, the reference picture of each subblock is the same as other subblocks, and the signaled CU-level motion information contains interDir, refIdx and MVP. In this example, the derivation of motion information for subblocks can further include: determining the reference picture for subblocks using refIdx of the signaled CU-level motion information; setting the CU-level motion to be the MVP; obtaining the scaled motion by scaling the collocated motion to the reference picture; and adding the scaled motion to the CU-level motion.

Figure 13:
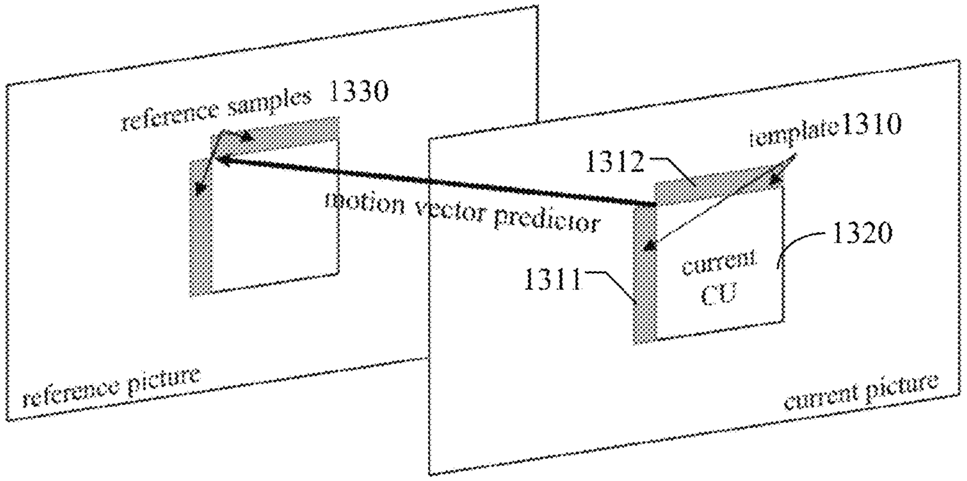
FIG. 13 illustrates an example for template matching, according to some embodiment of the present disclosure.

In some embodiments, the reference picture of each subblock is the same as other subblocks, and the signaled CU-level motion information contains interDir and MVD, and the reference picture and MVP may be determined using a (TM) cost. More specifically, for each reference picture, motion vector predictor candidates are derived in a similar way to the AMVP process of the regular inter prediction. FIG. 13 illustrates an example for template matching, according to some embodiment of the present disclosure. As shown in FIG. 13, TM costs are calculated for each motion vector predictor candidate. The template 1310 comprises reconstructed samples neighboring to the left 1311 and/or to the top 1312 of the CU 1320. The reference samples 1330 of the template are generated by each motion vector predictor candidate. The reference picture and MVP of the signaled CU-level motion information is thus set to the picture with minimum TM cost. In this example, the derivation of motion information for subblocks can further include: determining the reference picture and MVP for subblocks using TM cost; determining the CU-level motion by adding the MVD to the MVP; obtaining the scaled motion by scaling the collocated motion to the reference picture; and adding the scaled motion to the CU-level motion.

In some embodiments, continued from the above example, when calculating TM cost, instead of using only motion vector predictor candidates, the MVD is also involved for TM cost calculation. Specifically, the reference samples of the template are generated by the motion vector which is obtained by motion vector predictor candidate plus MVD.

In some embodiments, the reference picture of each subblock is different from other subblocks. That is, the refence pictures of the plurality of subblocks are different.

In some embodiments, the reference picture of each subblock is different from other subblocks and the signaled CU-level motion information contains interDir, refIdx, MVP and MVD. The derivation of motion information for subblocks can further include: determining the collocated motion and the reference picture of each subblock, wherein the reference picture is selected from any one of reference pictures in the reference picture list, and the selected reference picture is the one whose scaling factor is the closest to 1; obtaining the scaled motion by scaling the collocated motion to the determined reference picture; determining the CU-level motion by adding the MVD to the MVP; scaling the CU-level motion to the determined reference picture; and adding the scaled motion to the scaled CU-level motion.

In some embodiments, the reference picture of each subblock is different from other subblocks, and the signaled CU-level motion information contains interDir, MVP, and MVD, and the signaled CU-level motion information is pointed to a pre-defined reference picture. The pre-defined reference picture may be a collocated reference picture. The pre-defined reference picture may be signaled at slice-level, picture-level, PPS, or SPS level. The derivation of motion information for subblocks can further include: determining the collocated motion and the reference picture of each subblock, wherein the reference picture is selected from a plurality of reference pictures in a reference picture list, and the selected reference picture is the one whose scaling factor is the closest to 1; obtaining the scaled motion by scaling the collocated motion to the determined reference picture; determining the CU-level motion by adding the MVD to the MVP; scaling the CU-level motion to the determined reference picture; and adding the scaled motion to the scaled CU-level motion.

Figure 14:
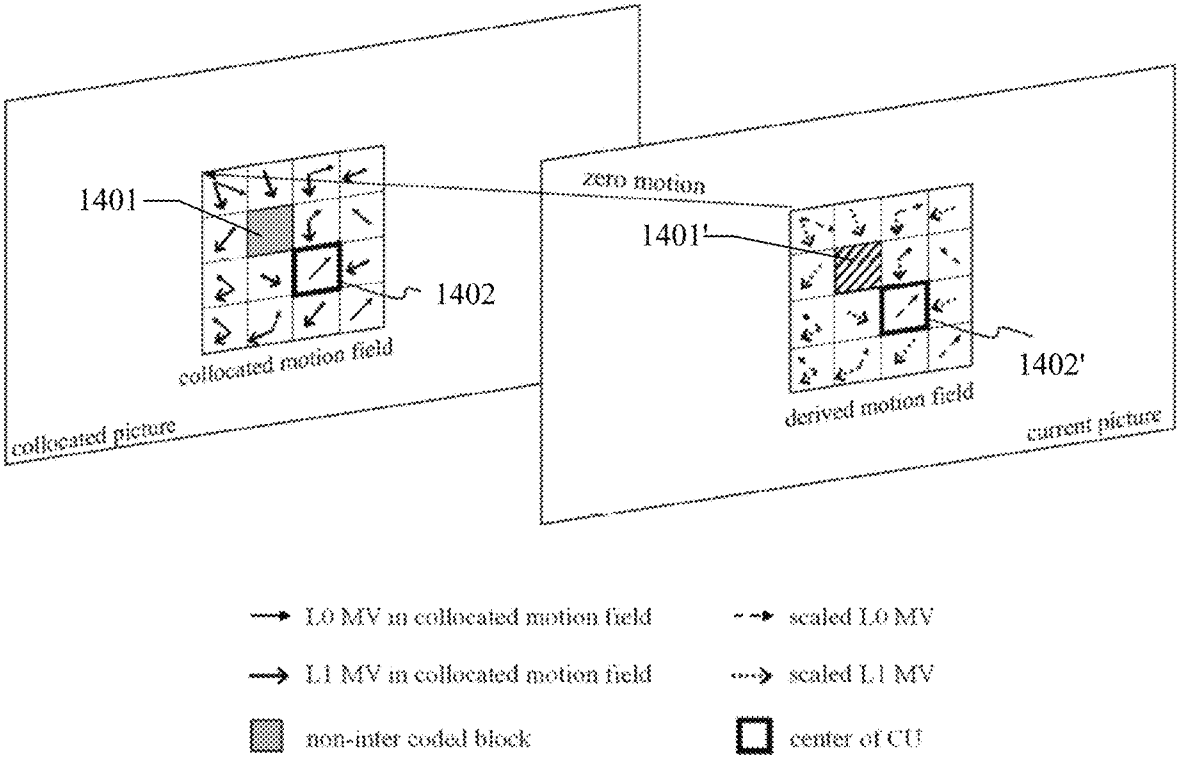
FIG. 14 illustrates an example collocated picture coded using non-inter mode, according to some embodiments.
Figure 15:
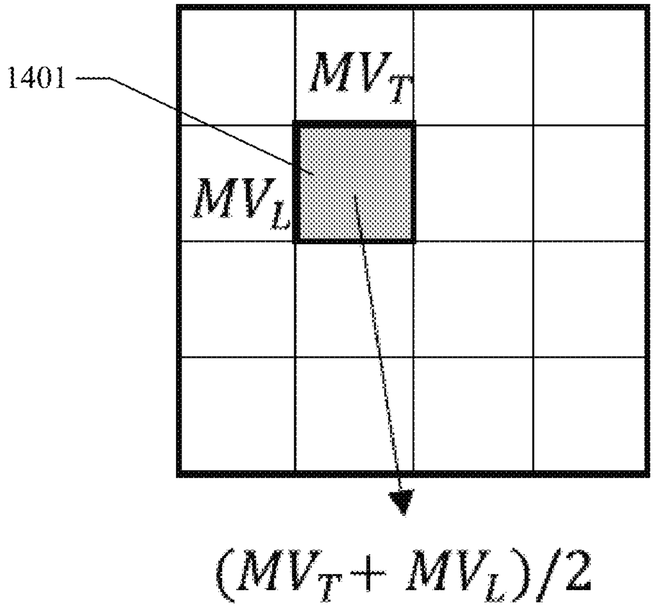
FIG. 15 illustrates an example averaged motion of top and left subblocks, according to some embodiments of the present disclosure.
Figure 16:
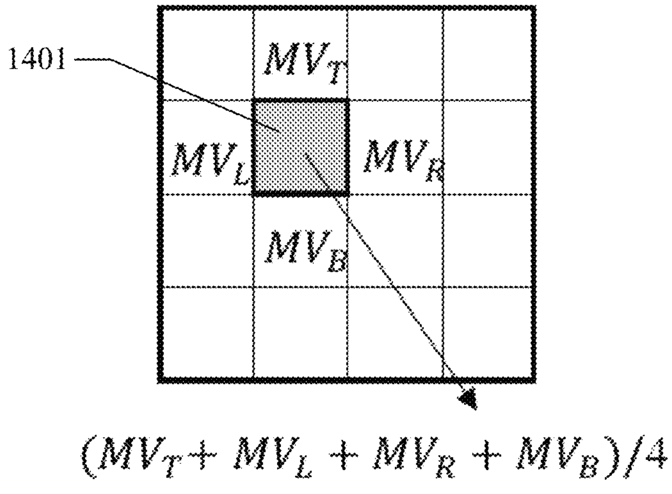
FIG. 16 illustrates an example averaged motion of surrounding subblocks, according to some embodiments of the present disclosure.

In some embodiments, the collocated subblock may be coded using non-inter mode, and the collocated motion does not exist. FIG. 14 illustrates an example collocated picture coded using non-inter mode, according to some embodiments. FIG. 15 illustrates an example averaged motion of top and left subblocks, according to some embodiments of the present disclosure. FIG. 16 illustrates an example averaged motion of surrounding subblocks, according to some embodiments of the present disclosure. As shown in FIG. 14, the collocated subblock 1401 in the collocated picture is non-inter coded. It is proposed to set the motion of that collocated subblock to one of a zero motion, the motion of the center subblock of the CU (e.g., subblock 1402 in FIG. 14), the averaged motion of top and left subblocks, i.e., $(MV_T+MV_T)/2$ (as shown in FIG. 15) the averaged motion of surrounding subblocks (FIG. 16), i.e., $(MV_T+MV_L+MV_R+MV_B)/4$ (as shown in FIG. 15), or the averaged motion of the CU. In some embodiments, when calculating an averaged motion of subblocks, the motion of each subblock is firstly scaled to the same reference picture, and the reference picture may be indicated by the signaled CU-level motion information or may be a collocated reference picture.

In some embodiments, the collocated motion is subtracted with an averaged motion before adding to the signaled CU-level motion information. Specifically, the derivation of motion information for subblocks can further include: determining the reference picture for subblocks using refIdx of the signaled CU-level motion information; determining the CU-level motion by adding the MVD to the MVP; obtaining the scaled motion by scaling the collocated motion to the reference picture; calculating an averaged motion of all the scaled motion; obtaining difference motion by subtracting the scaled collocated motion with the averaged motion; and adding the difference motion to the CU-level motion.

Figure 17:
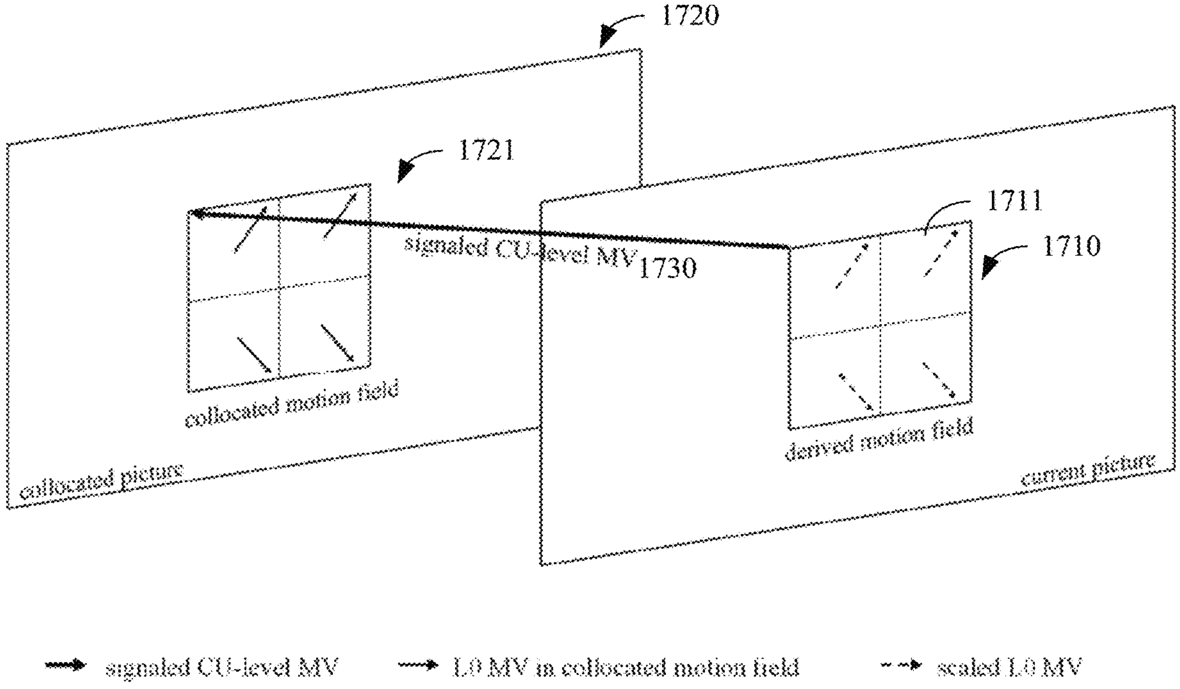
FIG. 17 is a schematic diagram illustrating an example of subblocks in a CU with a motion shift, according to some embodiments of the present disclosure.
Figure 18:
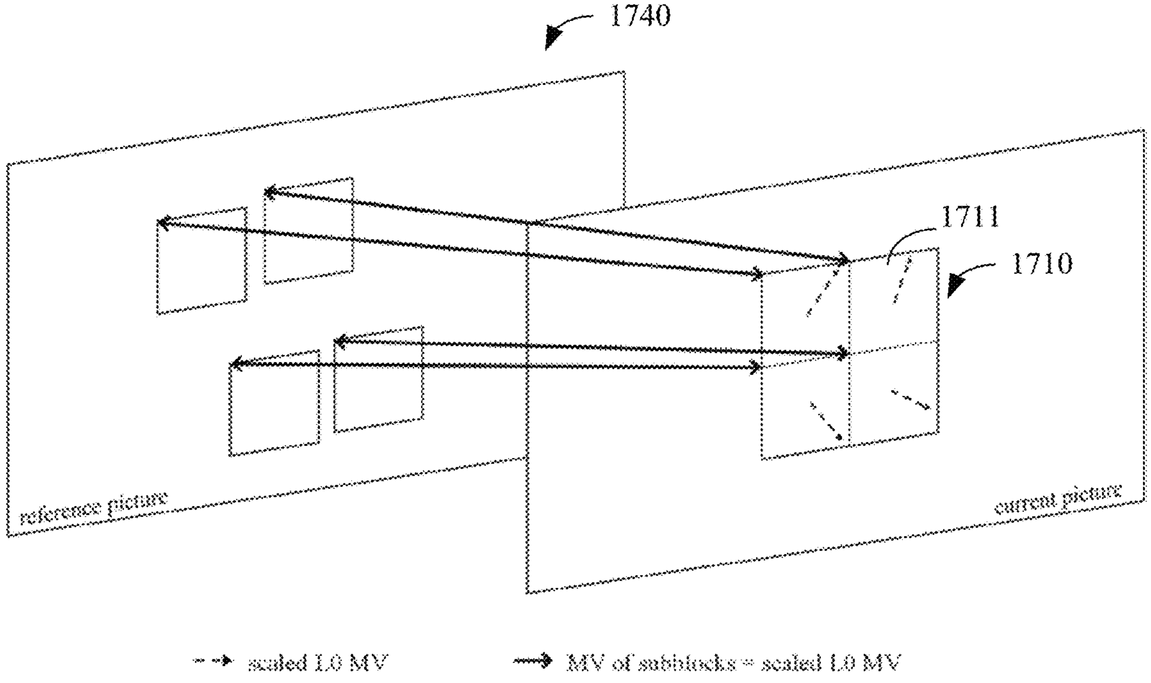
FIG. 18 is a schematic diagram illustrating an example of motion derivation for a subblock based on the motion shift, according to some embodiments of the present disclosure.

In the present disclosure, several examples are provided below for deriving the temporal motion information associated with the subblocks from a motion shift. Specifically, it is proposed to signal motion information at CU-level, and use it as motion shift to derive subblock temporal motion information. FIG. 17 is a schematic diagram illustrating an example of subblocks in a CU with a motion shift, according to some embodiments of the present disclosure. FIG. 18 is a schematic diagram illustrating an example of motion derivation for a subblock based on the motion shift, according to some embodiments of the present disclosure. Referring to FIG. 17, similar to SbTMVP mode, a CU 1710 is split into subblocks, e.g., a subblock 1711, and each subblock obtains its own motion vector from the motion field 1721 in the collocated picture 1720. When obtaining motion vector for each subblock, a motion shift is applied. The motion shift is signaled at CU-level 1730. Referring to FIG. 18, then, the motion in the collocated picture 1740 is converted to the motion information of subblock 1711. The signaled CU-level motion information may contain interDir, refIdx, MVP and MVD.

Figure 19:
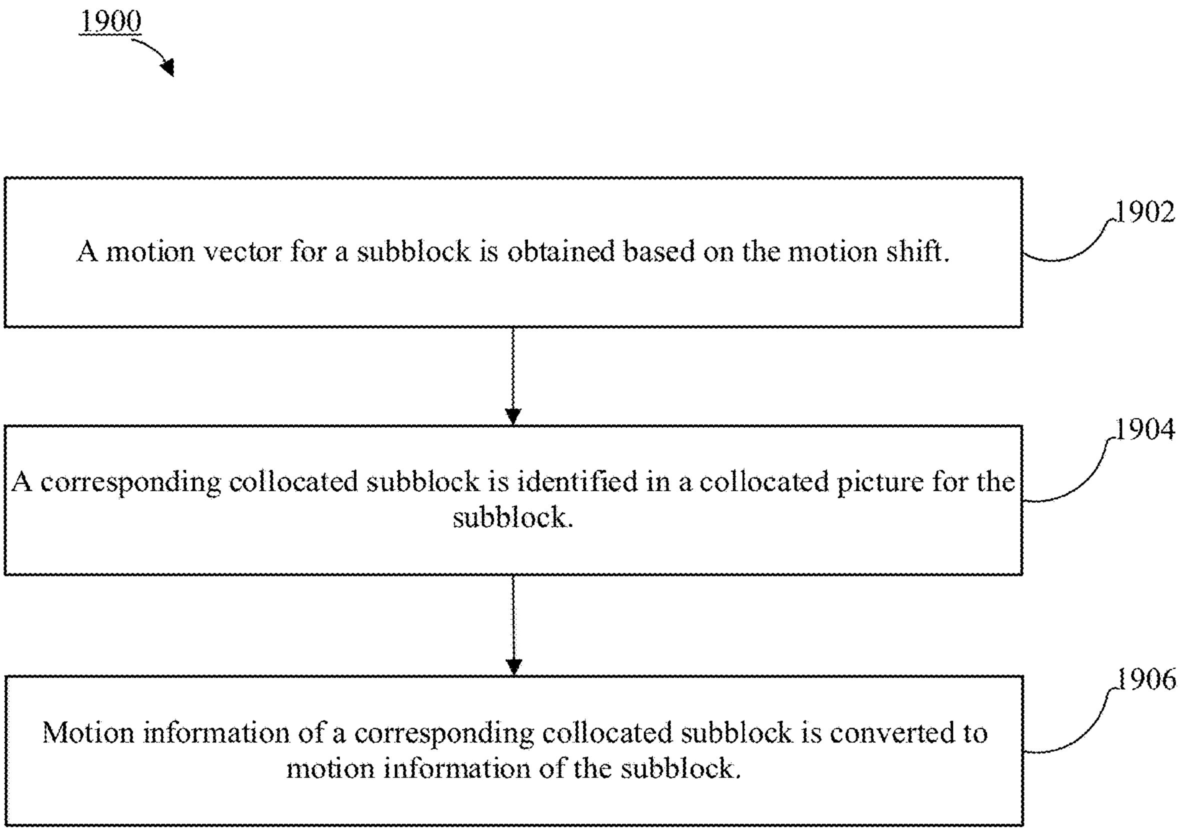
FIG. 19 illustrates a flow chart showing an example method for performing an sbAmvp mode based on a motion shift, according to some embodiments of the present disclosure.

FIG. 19 illustrates a flow chart showing a method 1900 for performing the sbAmvp mode based on a motion shift, according to some embodiments of the present disclosure. Method 1900 can be performed by a decoder (e.g., by process 300A of FIG. 3A or 300B of FIG. 3B) or performed by one or more software or hardware components of an apparatus (e.g., apparatus 400 of FIG. 4). For example, one or processors (e.g., processor 402 of FIG. 4) can perform method 1900. In some embodiments, method 1900 can be implemented by a computer program product, embodied in a computer-readable medium, including computer-executable instructions, such as program code, executed by computers (e.g., apparatus 400 of FIG. 4). Referring to FIG. 19, method 1900 may include the following steps 1902 to 1906.

At step 1902, a motion vector for a subblock is obtained based on the motion shift.

At step 1904, a corresponding collocated subblock is identified in a collocated picture for the subblock.

At step 1906, motion information of a corresponding collocated subblock is converted to motion information of the subblock.

In some embodiments, the signaled CU-level motion information contains MVP and MVD, and the MVP is pointed to the collocated reference picture. The derivation of motion information for subblocks can further include: determining the motion shift by adding MVD to MVP; identifying the corresponding subblocks in the collocated picture with the motion shift; and converting the motion information of the corresponding subblock to the motion information of the subblock.

In some embodiments, the signaled CU-level motion information only contains MVP, and the MVP is pointed to the collocated reference picture. The derivation of motion information for subblocks can further include: setting the motion shift to MVP; identifying the corresponding subblocks in the collocated picture with the motion shift; and converting the motion information of the corresponding subblock to the motion information of the subblock.

In some embodiments, when converting the motion information of the corresponding subblock to the motion information of the subblock, the reference index of the subblock is selected from any one of reference pictures in the reference picture list. The selected reference picture is the one having a scaling factor closest to 1.

In some embodiments, the signaled CU-level motion information contains interDir, refIdx, MVP and MVD, and the MVP is pointed to the collocated reference picture. The MVP and MVD are used to derive motion shift, and the interDir and refIdx are used to derive the reference picture of subblocks. The derivation of motion information for subblocks can further include: determining the motion shift by adding MVD to MVP; identifying the corresponding subblocks in the collocated picture with the motion shift; determining the reference picture of subblocks using interDir and refIdx; and scaling the motion information of the corresponding subblock to the reference picture.

The above proposed sbAmvp mode with variety of examples may be combined with a local illumination compensation (LIC) mode, a multi-hypothesis prediction (MHP) mode, an overlapped block motion compensation (OBMC) mode, a bi-prediction with CU-level weight (BCW) mode, and/or an adaptive motion vector resolution (AMVR) mode.

The present disclosure also provides embodiments for MVP derivation and signaling.

In some embodiments, the MVP of a CU may be derived using the same process of the AMVP MVP derivation process in ECM. That is, an MVP candidate list is firstly constructed using the motions from spatial neighboring blocks, temporal collocated block, non-adjacent neighboring blocks, and a History-based Motion Vector Prediction (HMVP) table. An HMVP table contains history motion candidates that can be used to help predict future motions and movements. By using these various motion sources and the HMVP table, the candidate list is able to capture a comprehensive range of potential MVPs. Then, the template matching (TM) cost is calculated for each MVP candidate, and the one with minimum TM cost is selected and is further refined with the template matching process. The TM cost is calculated using the neighboring reconstructed samples and the reference samples predicted using the MVP candidate.

Figure 20:
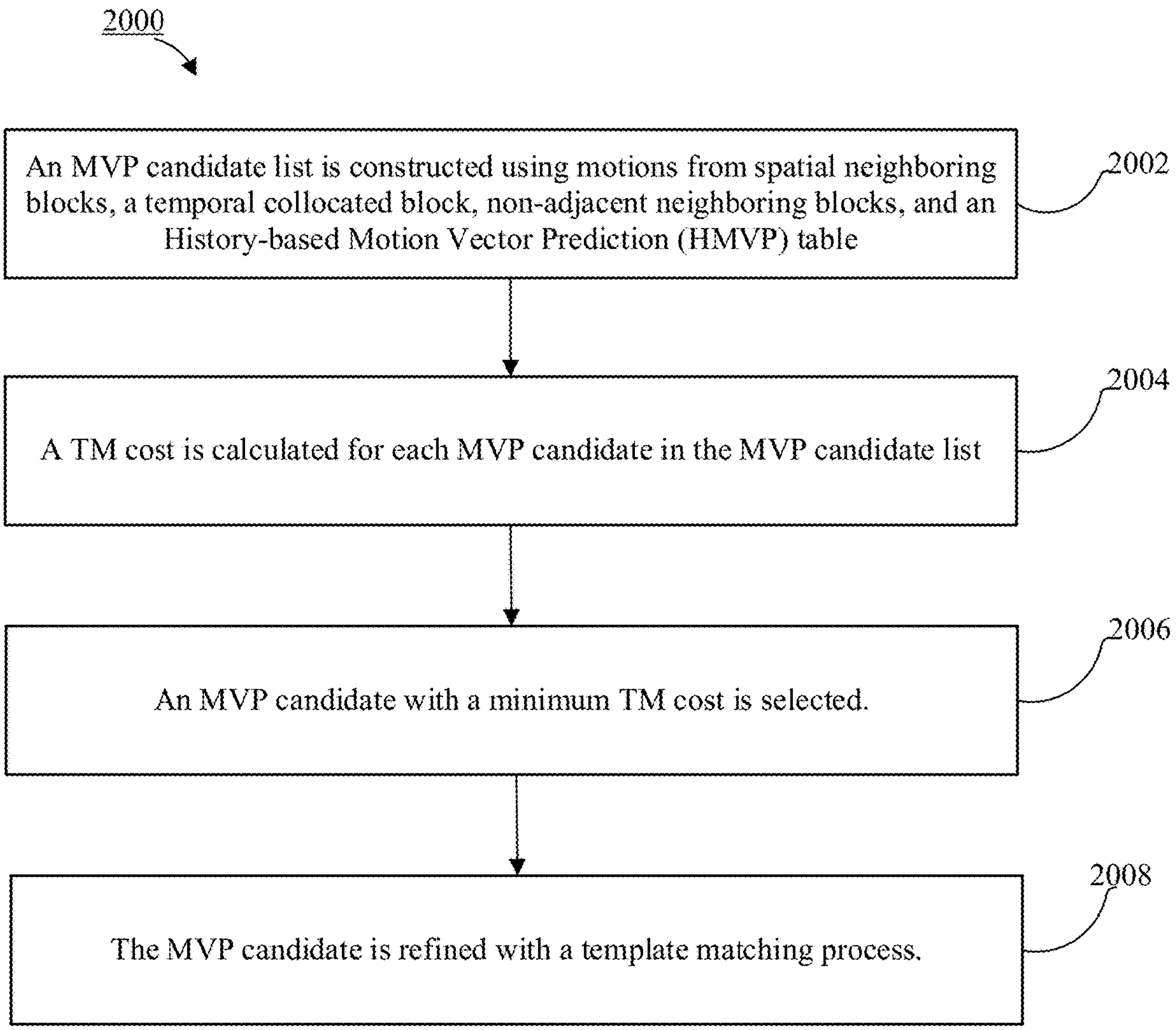
FIG. 20 illustrates a flow chart showing an example method for MVP derivation, according to some embodiments of the present disclosure.

FIG. 20 illustrates a flow chart showing an example method 2000 for MVP derivation, according to some embodiments of the present disclosure. Method 2000 can be performed by a decoder (e.g., by process 300A of FIG. 3A or 300B of FIG. 311) or performed by one or more software or hardware components of an apparatus (e.g., apparatus 400 of FIG. 4). For example, one or more processors (e.g., processor 402 of FIG. 4) can perform method 2000. In some embodiments, method 2000 can be implemented by a computer program product, embodied in a computer-readable medium, including computer-executable instructions, such as program code, executed by computers (e.g., apparatus 400 of FIG. 4). Referring to FIG. 20, method 2000 may include the following steps 2002 to 2008.

At step 2002, an MVP candidate list is constructed using motions from spatial neighboring blocks, a temporal collocated block, non-adjacent neighboring blocks, and a History-based Motion Vector Prediction (HMVP) table.

At step 2004, a TM cost is calculated for each MVP candidate in the MVP candidate list.

At step 2006, an MVP candidate with a minimum TM cost is selected.

At step 2008, the MVP candidate is refined with a template matching process.

Figure 21:
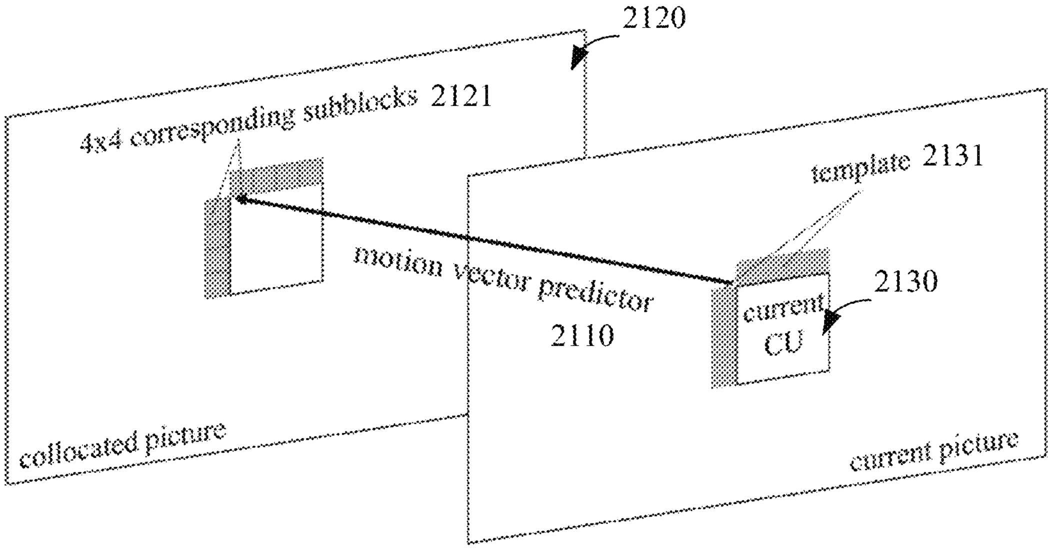
FIG. 21 illustrates an example prediction process of reference samples, according to some embodiments of the present disclosure.

In some embodiments, the reference samples are predicted using the corresponding collocated temporal motion instead of the MVP candidate. FIG. 21 illustrates an example prediction process of reference samples, according to some embodiments of the present disclosure. As shown in FIG. 21, the MVP 2110 is pointed to the collocated picture 2120, and the corresponding neighboring subblocks 2121 are identified. For each corresponding neighboring subblock 2121, a temporal motion is derived and is used to predict the reference samples of the template 2131 for a current CU 2130.

For the MVD signaling, in one example, the MVD is signaled in the same way as the AMVP MVD in ECM. That is, the absolute values of MVD in horizontal and vertical directions are separately binarized and signaled. The sign of MVD may be reordered using TM cost and be indicated by a signaled index.

Figure 22:
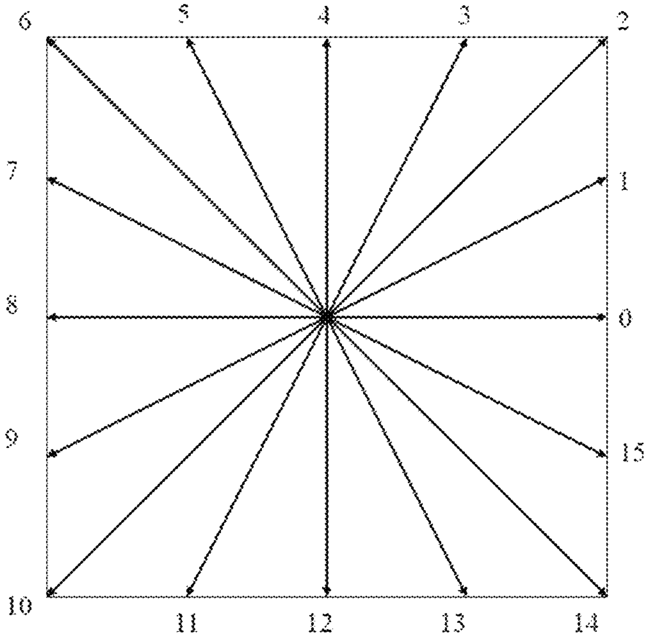
FIG. 22 illustrates an example of motion directions, according to some embodiments of the present disclosure.

In some embodiments, the MVD is constructed with an index indicating a motion magnitude, and an index indicating a motion direction. The motion magnitude and the motion direction are selected from pre-defined sets respectively. In one example, a pre-defined set for motion magnitude is {¼-pel, ½-pel, 1-pel, 2-pel, 4-pel, 8-pel}, which is similar to that used in MMVD (merge with motion vector difference) mode. In another example, considering the TMVP (temporal motion vector prediction) is stored in 4×4 block grid, in order to obtain different TMVP, the MVD is a multiple of 4-pel. Therefore, the pre-defined set for motion magnitude can be {4-pel, 8-pel, 16-pel, 32-pel, 64-pel, 128-pel}. FIG. 22 illustrates an example of motion directions, according to some embodiments of the present disclosure. The pre-defined set for motion direction can be any subset of directions shown in FIG. 22.

The pre-defined set for motion magnitude may be modified according to sequence resolution, motion direction, and etc. In one example, for a sequence resolution larger than 4096000 luma samples, the pre-defined set for motion magnitude is set to {8-pel, 16-pel, 32-pel, 64-pel}. For a sequence resolution smaller than or equal to 4096000 luma samples, the pre-defined set for motion magnitude is set to {4-pel, 8-pel, 16-pel, 32-pel}. In another example, for horizontal motion direction, the pre-defined set for motion magnitude is set to {4-pel, 8-pel, 16-pel, 32-pel}. For vertical motion direction, the pre-defined set for motion magnitude is set to {4-pel, 8-pel, 12-pel, 16-pel}.

The two indices for motion magnitude and motion direction may be signaled separately. Alternatively, the two indices are combined jointly and signaled.

In some embodiments, the pre-defined set for motion magnitude is set to {4-pel, 8-pel, 16-pel, 32-pel, 64-pel, 128-pel}. The pre-defined set for motion direction is set to {0, 4, 8, 12} referring to the motion directions shown in FIG. 22. A parameter, for example, an index or a variable, whose value is ranging from 0 to 23, is signaled to indicate the motion magnitude and motion direction, and the index for motion magnitude and the index for motion direction are derived as follows:

index for motion magnitude=the signaled parameter/(number of motion directions=4), index for motion direction=the signaled parameter %(number of motion directions=4).

In another example, all the possible combinations of motion magnitude and motion direction are reordered according to the TM cost, and a parameter (for example, an index) is signaled to indicate which combination is used.

In some embodiments, a high-level flag is signaled to indicate whether the proposed method is used or not, wherein the high-level flag may be an SPS flag, a PPS flag, a picture header level flag, or a slice level flag. In addition, the high-level flag may be signaled only when TMVP is enabled.

In some embodiments, a CU-level flag is signaled to indicate whether the proposed sbAmvp mode is used or not. The CU-level flag is signaled when the CU is not coded using merge mode.

It is noted that all the proposed methods can be combined freely. For example, for a CU coded using non-merge mode. A CU-level flag is signaled to indicate whether the proposed method is used or not. When the proposed method is used, a first parameter is signaled to indicate whether the MVD is zero or not. If the MVD is non-zero, a second parameter that indicates the motion magnitude and the motion direction of MVD is signaled. The index for motion magnitude and the index for motion direction are derived as follows:

index for motion magnitude=the second parameter/number of motion directions, index for motion direction=the second parameter % number of motion directions.

| | | | | | | |
|---|---|---|---|---|---|---|
| Index for motion magnitude | 0 | 1 | 2 | 3 | 4 | 5 |
| Motion magnitude (in unit of luma sample) | 4 | 8 | 16 | 32 | 64 | 128 |
| Index for motion direction | 0 | 1 | 2 | 3 | | |
| Motion direction | left | right | top | bottom | | |

In some embodiments, if the interDir in CU-level motion information is not signaled, the interDir in motion information of subblock is inferred to be the reference direction that contains the collocated picture. In some embodiments, if the refIdx in CU-level motion information is not signaled, a refIdx in motion information of subblock is set to be the index of the collocated picture. Moreover, the AMVR, LIC, BCW, MIP parameters are not signaled and are inferred to be disabled. The OBMC flag is signaled to indicate whether the OBMC is applied to the proposed method or not.

In some embodiments, when a CU is coded using the proposed sbAmvp mode, the CU is split into subblocks and each subblock obtains its own motion vector from the motion field in the collocated picture. The derivation of motion information for subblocks can further include: determining the motion shift by adding MVD to MVP; identifying the corresponding subblocks in the collocated picture with the motion shift; and converting the motion information of the corresponding subblock to the motion information of the subblock.

In some embodiments, when the motion information of the corresponding subblock is not available, the motion information of the center subblock is used. If the motion information of the center subblock is also not available, the motion shift is used.

Figure 23:
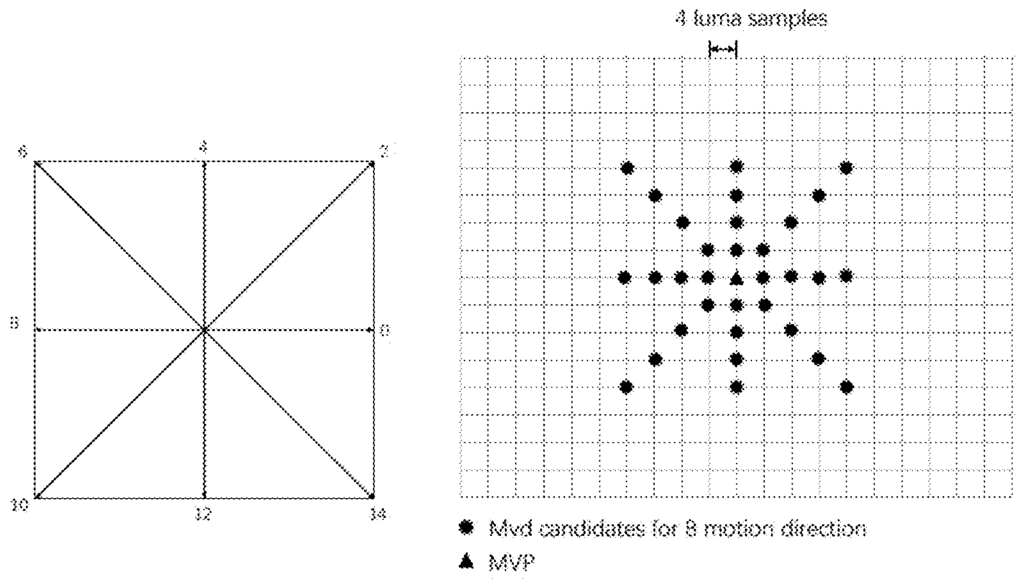
FIG. 23 illustrates example candidates with fixed motion direction, according to some embodiments of the present disclosure.
Figure 24:
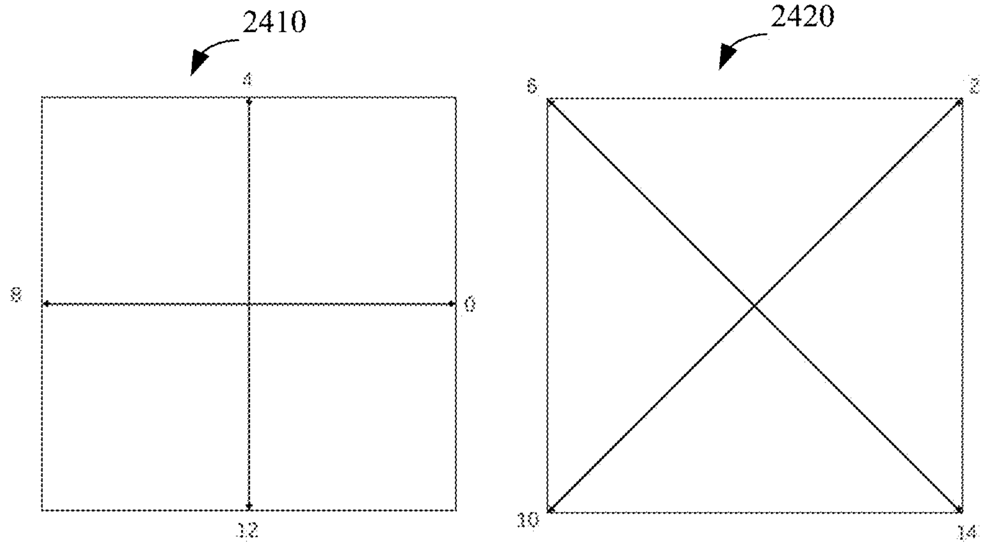
FIG. 24 illustrates example two sets of motion direction, according to some embodiments of the present disclosure.
Figure 25:
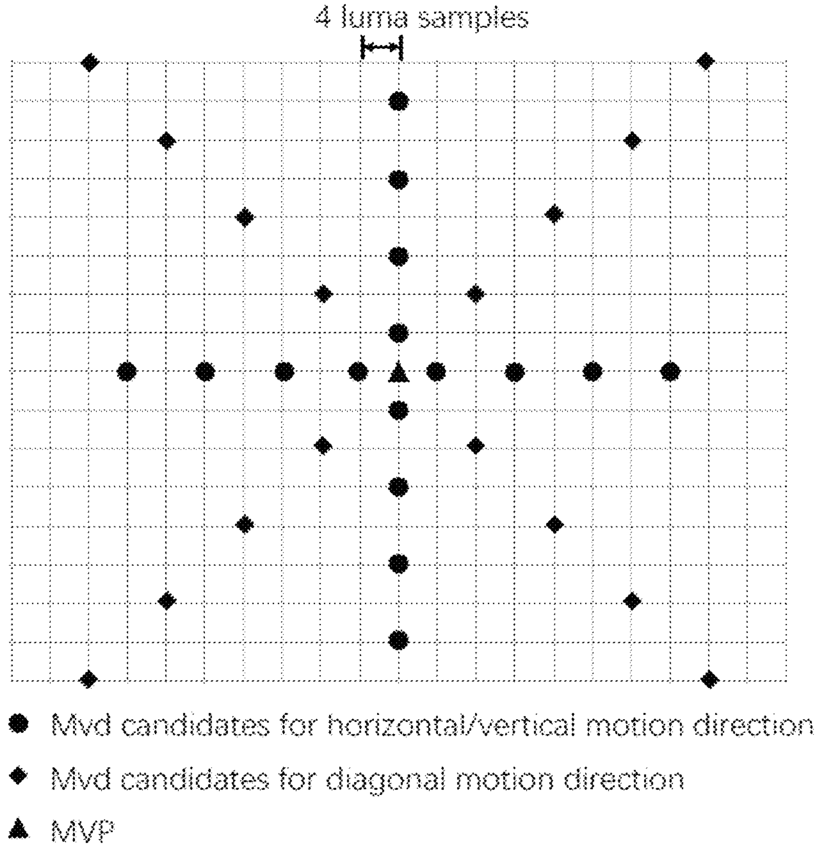
FIG. 25 illustrates example candidates with two sets of motion directions shown in FIG. 24, according to some embodiments of the present disclosure.

In some embodiments, the candidates of motion direction may be changed according to the index of motion magnitude. FIG. 23 illustrates example candidates with fixed motion direction, according to some embodiments of the present disclosure. FIG. 24 illustrates example two sets of motion direction, according to some embodiments of the present disclosure. Instead of the fixed motion direction (an example is shown in FIG. 23), two sets of motion directions are proposed as shown in FIG. 24. In a first set 2410, horizontal and vertical directions are supported. In a second set 2420, 4 diagonal directions are supported. When the index of motion magnitude is an even number, first set 2410 of motion directions are used. When the index of motion magnitude is an odd number, the second set 2420 of motion directions are used. FIG. 25 illustrates example candidates with two sets of motion directions shown in FIG. 24, according to some embodiments of the present disclosure. As shown in FIG. 25, MVD candidates in two sets of motion directions are illustrated.

Instead of using the same number of motion magnitudes and motion directions for all pictures in one sequence, it can be changed from picture to picture since the characteristic of each picture may be different from each other. Therefore, in this disclosure, it is proposed to determine a number of motion magnitudes and motion directions for each picture using either implicit or explicit methods. The proposed methods can be applied to existing ECM coding mode such as MMVD, SbTMVP as well.

Figure 26:
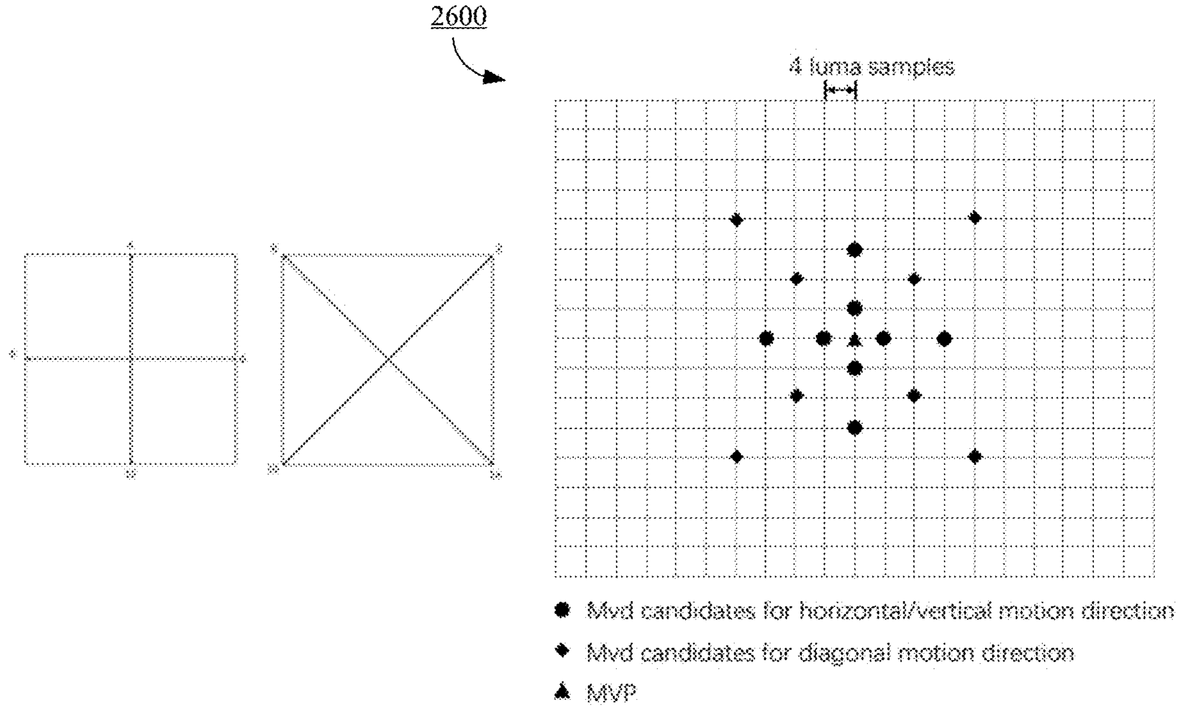
FIG. 26 illustrates an example first group of motion magnitude and motion direction, according to some embodiments of the present disclosure.
Figure 27:
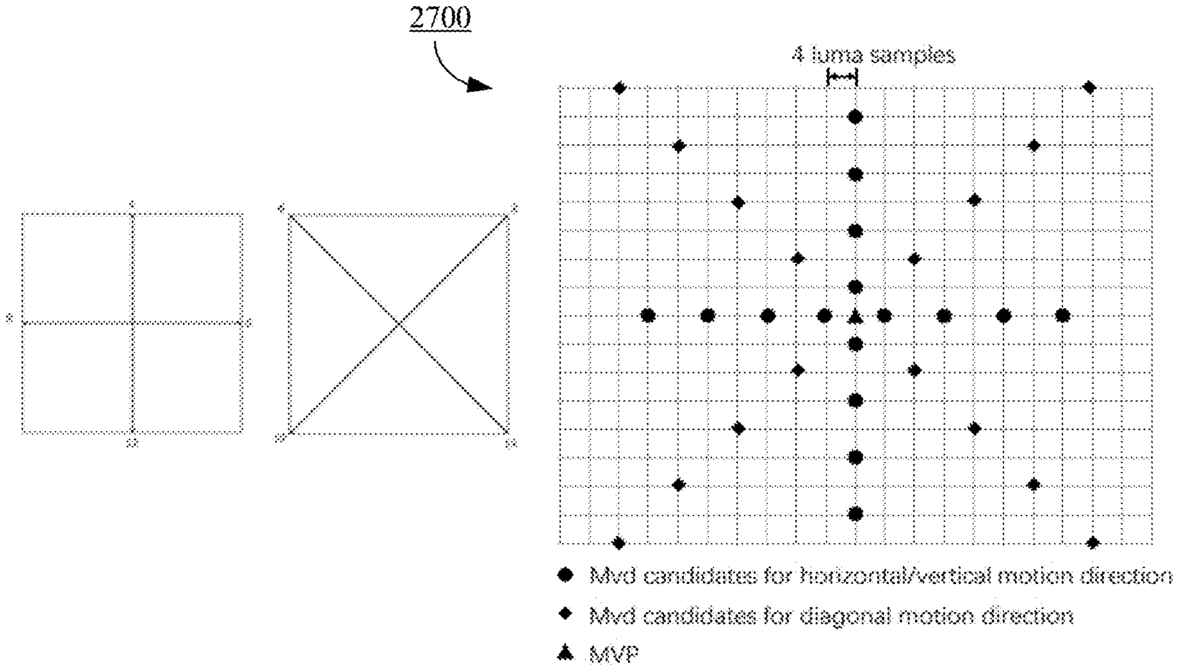
FIG. 27 illustrates an example second group of motion magnitude and motion direction, according to some embodiments of the present disclosure.
Figure 28:
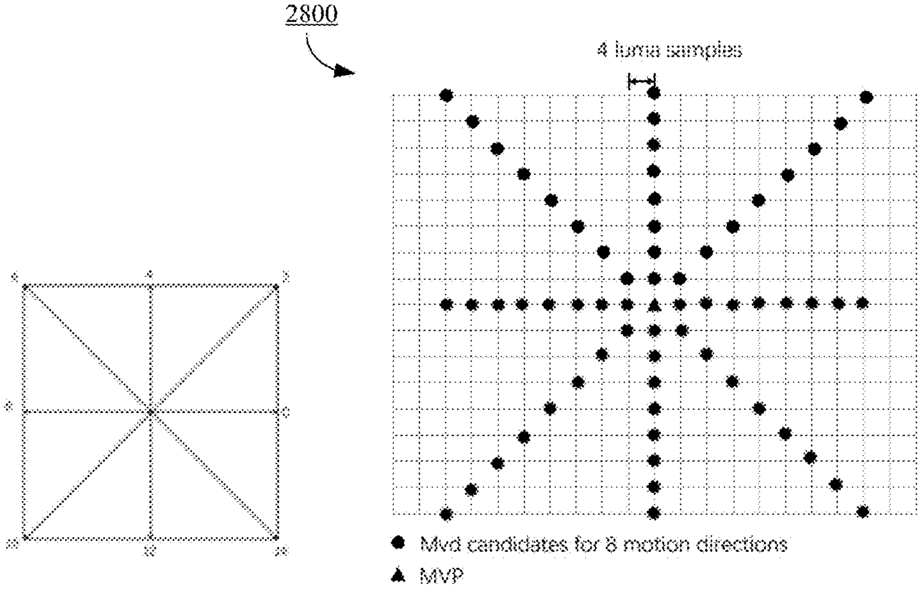
FIG. 28 illustrates an example third groups of motion magnitude and motion direction, according to some embodiments of the present disclosure.

FIG. 26 illustrates an example first group of motion magnitude and motion direction, according to some embodiments of the present disclosure. FIG. 27 illustrates an example second group of motion magnitude and motion direction, according to some embodiments of the present disclosure. FIG. 28 illustrates an example third group of motion magnitude and motion direction, according to some embodiments of the present disclosure. As shown in FIG. 26, a first group 2600 of motion magnitude and motion direction includes 4 motion magnitudes with 2 sets of motion directions. As shown in FIG. 27, a second group 2700 of motion magnitude and motion direction includes 8 motion magnitudes with 2 sets of motion directions. As shown in FIG. 28, a third group 2800 of motion magnitude and motion direction includes 4 motion magnitudes with 8 fixed motion directions.

In some embodiments, the number of motion magnitudes and motion directions is determined according to whether a current picture or a current slice is a low delay picture or not. For example, if a current picture or slice is a low delay picture, 8 motion magnitudes with 2 sets of motion directions (second group 2700 in FIG. 27) is used. If the current picture/slice is a non-low delay picture, 8 motion magnitudes with 8 fixed motion directions (third group 2800 in FIG. 28) is used.

In some embodiments, the number of motion magnitudes and motion directions is determined according to the POC difference between a current picture and its collocated picture. For example, if the POC difference between a current picture/slice and its collocated picture is larger than a positive integer value (e.g., 2), 4 motion magnitudes with 2 sets of motions (first group 2600 in FIG. 26) are used. If the POC difference between a current picture/slice and its collocated picture is equal to or smaller than a positive integer value (e.g., 2), 8 motion magnitudes with 8 fixed motion directions (third group 2800 in FIG. 28) are used.

In some embodiments, the number of motion magnitudes and motion directions is determined according to temporal layer. For example, if the temporal layer of a current picture/slice is larger than a non-negative integer value (e.g., 3), 4 motion magnitudes with 2 sets of motion directions (first group 2600 in FIG. 26) are used. If the temporal layer of a current picture/slice is equal to or smaller than the non-negative integer value (e.g., 3), 8 motion magnitudes with 8 fixed motion direction (third group in FIG. 28) are used.

In some embodiments, the number of motion magnitudes and motion directions is determined according to the parity of POC number of a current picture/slice. For example, if the POC of a current picture/slice is an even number, 8 motion magnitudes with 8 fixed motion directions (third group 2800 in FIG. 28) is used. If the POC of the current picture/slice is an odd number, 8 motion magnitudes with 2 set of motion directions (second group 2700 in FIG. 27) is used.

The motion magnitudes associated with FIGS. 26-28 are listed in the following Tables 1-3, respectively.

TABLE 1

| 4 motion magnitudes with 2 sets of motion direction | | |
|---|---|---|
| Index for motion magnitude | | |
| Motion magnitude (in unit of luma sample) | 2 | 6 |

TABLE 2

| 8 motion magnitudes with 2 sets of motion direction | | | | | | |
|---|---|---|---|---|---|---|
| Index for motion magnitude | | | | | | |
| Motion magnitude (in unit of luma sample) | 2 | 6 | 0 | 4 | 8 | 2 |

TABLE 3

| 8 motion magnitudes with 8 fixed motion directions | | | | | | |
|---|---|---|---|---|---|---|
| Index for motion magnitude | | | | | | |
| Motion magnitude (in unit of luma sample) | 2 | 6 | 0 | 4 | 8 | 2 |

In some embodiments, the number of motion magnitudes and motion directions is determined according to a quantization parameter (QP) of a current picture/slice.

The disclosed methods for determining the number of motion magnitudes and motion directions can be combined freely.

Figure 29:
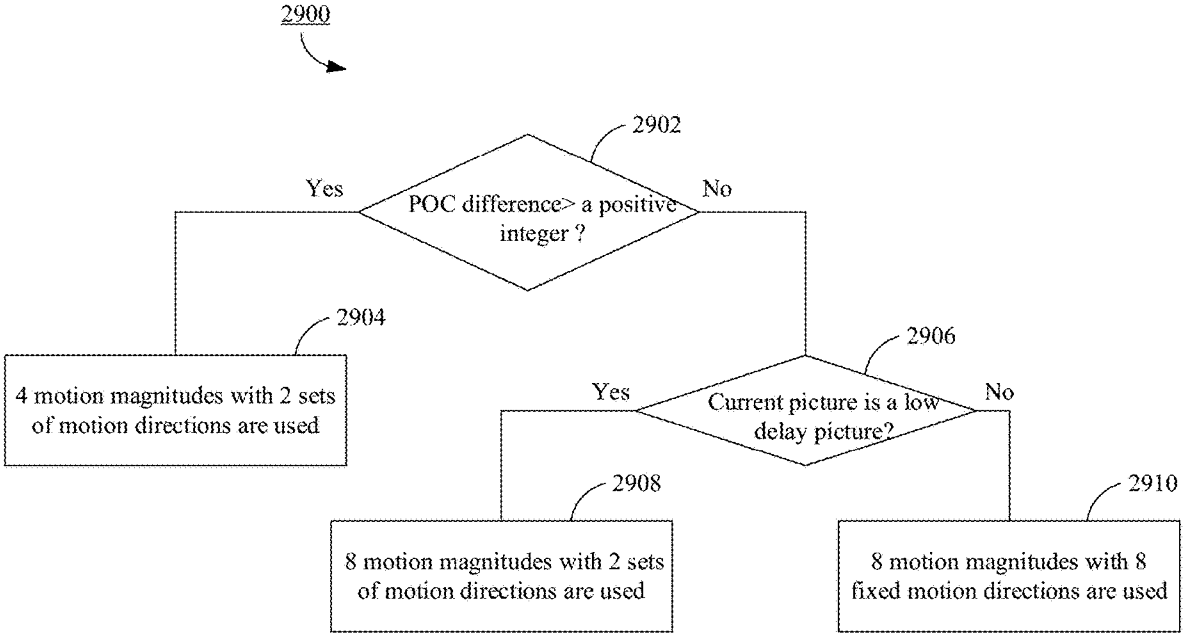
FIG. 29 illustrates a flowchart showing an example method for determining the group of motion magnitudes and motion directions to use, according to some embodiment of the present disclosure.

In some embodiments, the number of motion magnitudes and motion directions is determined according to the POC difference between a current picture and its collocated picture and whether the current picture is a low delay picture or not. FIG. 29 illustrates a flowchart 2900 for determining the group of motion magnitudes and motion directions to use, according to some embodiment of the present disclosure. As shown in FIG. 29, in step 2902, whether a POC difference between a current picture and a corresponding collocated picture of the current picture is greater than a positive integer is determined. If the POC difference between a current picture and its collocated picture is larger than the positive integer value (e.g., 2), at step 2904, 4 motion magnitudes with 2 sets of motion directions (first group 2600 in FIG. 26) are used. If the POC difference between a current picture and its collocated picture is equal to or smaller than the positive integer value (e.g., 2), turning to step 2906, whether the current picture is a low delay picture is determined. If the current picture is a low delay picture, at step 2908, 8 motion magnitudes with 2 sets of motion directions (second group 2700 in FIG. 27) is used. If the current picture is a non-low delay picture, at step 2910, 8 motion magnitudes with 8 fixed motion directions (third group 2800 in FIG. 28) is used.

Figure 30:
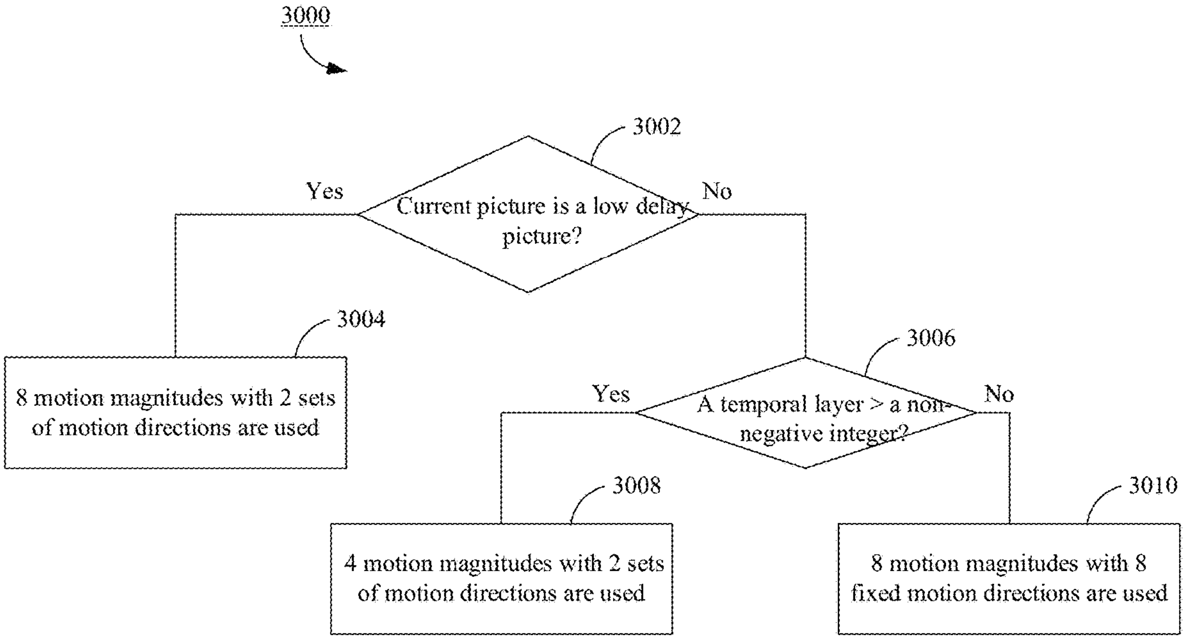
FIG. 30 illustrates another flowchart showing an example method for determining the group of motion magnitudes and motion directions to use, according to some embodiment of the present disclosure.

In some embodiments, the number of motion magnitudes and motion directions is determined according to temporal layer and whether the current picture is a low delay picture or not. FIG. 30 illustrates another flowchart 3000 for determining the group of motion magnitudes and motion directions to use, according to some embodiment of the present disclosure. As shown in FIG. 30, at step 3002, whether a current picture is a low delay picture is determined. If the current picture is a low delay picture at step 3004, 8 motion magnitudes with 2 sets of motion directions (second group 2700 in FIG. 27) is used. If the current picture is a non-low delay picture, turning to step 3006, whether a temporal layer of the current picture is larger than a non-negative integer is determined (e.g., 4). If the temporal layer of the current picture is larger than the non-negative integer (e.g., 4), at step 3008, 4 motion magnitudes with 2 sets of motion directions (first group 2600 in FIG. 26) are used. If the temporal layer of the current picture is equal to or smaller than the non-negative integer, at step 3010, 8 motion magnitudes with 8 fixed motion directions (third group 2800 in FIG. 23) is used.

In some embodiments, instead of implicitly determining the number of motion magnitudes and motion directions for each picture, the setting can be explicitly signaled at picture header or slice header.

In some embodiments, two flags are signaled to indicate the number of motion magnitudes and the number of motion directions, respectively. For example, a first flag is signaled to indicate whether the number of motion magnitudes is equal to 4 or 8, and a second flag is signaled to indicate whether the number of motion directions is fixed to 8 or is adaptively switching between two sets of motion direction.

In some embodiments, only 3 kinds of setting (FIG. 26, FIG. 27, FIG. 28) for the number of motion magnitudes and motion directions are supported. A first flag is signaled to indicate whether 8 motion magnitudes with 8 fixed motion directions (third group 2800 in FIG. 28) are used. If 8 motion magnitudes with 8 fixed motion directions are not used, a second flag is signaled to indicate which one of 4 motion magnitudes with 2 sets of motion directions (first group 2600 in FIG. 26) and 8 motion magnitudes with 2 sets of motion directions (second group 2700 in FIG. 27) is used.

In some embodiments, the first flag and the second flag are only signaled for non-low delay pictures. For low delay pictures, it is always fixed to be 8 motion magnitudes with 2 sets of motion directions (second group 2700 in FIG. 27).

In some embodiments, for the encoder side, a fast algorithm may be applied. Basically, the proposed sbAmvp mode may not be tested according to the best coding mode of a current block or the best coding mode of a history block that is located in the same position and with the same size of the current block.

For example, the number of MVD to be tested for the proposed sbAmvp mode is reduced by half when the best coding mode of a current block is not SbTMVP mode, and the history block is also not coded with SbTMVP mode or the proposed method.

To reduce the encoder and decoder complexity, in some embodiments, a slice header flag is signaled to indicate whether the proposed sbAmvp mode is enabled for the current slice or not. The slice header flag is determined according to an enabled area of the proposed sbAmvp mode and the SbTMVP mode in previous decoded pictures. When the enabled area is larger than a pre-defined threshold, the proposed mode is enabled for the current slice and the slice header flag is set to be true. An enabled area refers to a number of samples/pixels coded using sbAmvp/SbTMVP mode. Otherwise, if the enabled area is not larger than the pre-defined threshold, the proposed mode is disabled for the current slice and the slice header flag is set to be false. In some embodiments, the pre-defined threshold may be changed according to one or more of the QP of the current slice, temporal layer, low delay condition, etc.

In some embodiments, the proposed sbAmvp mode is disabled for a block whose width or height is smaller than a pre-defined positive value N. For example, the value N can be set equal to 8.

In some embodiments, the proposed sbAmvp mode is disabled for a block whose width or height is larger than a pre-defined positive value M. For example, the value M can be set equal to 64.

According to some embodiments, multiple collocated pictures can be used to derive temporal motion. As described above regarding the temporal motion derivation used in VVC, an additional collocated picture is introduced in ECM. The additional collocated picture is different from the original collocated picture used in VVC. Several methods are proposed in this disclosure to select a collocated picture for the proposed sbAmvp.

In some embodiments, the collocated picture for the sbAmvp mode is always fixed to be the original collocated picture used in VVC.

In some embodiments, when a block is coded using sbAmvp mode, a flag is signaled to indicate which one of the two collocated pictures is used to derive temporal motion. When the flag is equal to 0, the original collocated picture is used. Otherwise, when the flag is equal to 1, the additional collocated picture is used.

In some embodiments, when a block is located at a low delay picture, a flag is signaled to indicate which one of the two collocated pictures is used to derive temporal motion. When a block is located at a non-low delay picture, the collocated picture is always fixed to be the original collocated picture used in VVC.

In some embodiments, the above-described block level reference picture list reordering technology can be applied to reorder the two collocated pictures (the original collocated picture and the additional collocated picture). A flag is signaled to indicate which one of the collocated pictures (with index 0 or with index 1) is used to derive temporal motion for the proposed sbAmvp mode.

In some embodiments, two motion vector predictors of the two collocated pictures are first derived. Then, TM costs of the two motion vector predictors are calculated. The one with minimum TM cost is selected, and its corresponding collocated picture is used to derive temporal motion for the proposed sbAmvp mode.

In some embodiments, when a block is coded using the proposed sbAmvp mode, a flag is signaled to indicate the inter prediction direction of the block. The collocated picture used to derive temporal motion is determined according to the inter prediction direction of the block. The collocated picture is selected from the reference picture list which the inter prediction direction of the block pointed to.

In some embodiments, the number of collocated pictures is determined according to whether a current picture is a low delay picture. If the current picture is a low delay picture, two collocated pictures (the original collocated picture used in VVC and the additional collocated picture described above) are used, and a flag is signaled for a sbAmvp coded block to indicate which one of the collocated pictures is used. If the current picture is a non-low delay picture, only the original collocated picture is used.

According to some embodiments, various methods can be used to select the reference pictures. In the design of sbTMVP mode, the reference index of the subblock is selected from any one of reference pictures in the reference picture list. The selected reference picture is the one whose scaling factor is the closest to 1. The temporal motion scaling is applied after the reference index is identified.

In some embodiments, in the proposed sbAmvp mode, the reference index of the subblock is derived using the same way as that of sbTMVP mode. That is, the reference index of the subblock may be different from each other.

In some embodiments, to reduce the discontinuity between subblocks, it is proposed to fix the reference index of the subblock within a block coded using the sbAmvp mode. As an example, the reference index of the subblock is fixed to 0. As another example, a reference index for each subblock is first calculated. For each subblock, a reference index whose scaling factor is the closest to 1 is selected. A histogram is constructed using the selected reference indices of subblocks. Then, the reference index with highest magnitude is selected for all subblocks, and the temporal motion scaling is applied to scale all the temporal motion of subblocks to the reference index with highest magnitude.

According to some embodiments, the proposed sbAmvp mode can be combined with adaptive motion vector resolution (AMVR) mode. In the regular inter mode, the motion vector difference can be signaled in difference resolution including {¼-pel, 1-pel, 4-pel, ½-pel}. To fully utilize the benefits of AMVR mode, the present disclosure proposes to combine the proposed sbAmvp mode with the AMVR mode.

In some embodiments, when a block is coded using sbAmvp mode, a parameter (for example, an index) is signaled to indicate the resolution of MVD magnitude. The parameter may be signaled in the same way as that of regular inter mode. Considering the TMVP is stored in 4×4 block grid, the MVD magnitude can be a multiple of 4-pel in order to obtain different TMVP. Therefore, when combining the proposed sbAmvp mode with AMVR, the resolution of sbAmvp's MVD magnitude is {4-pel, 16-pel, 64-pel, 8-pel}.

In some embodiments, the resolution of sbAmvp's MVD magnitude can be any subset of {4-pel, 16-pel, 64-pel, 8-pel}. For example, the resolution of sbAmvp's MVD magnitude is {4-pel, 16-pel}. In another example, the resolution of sbAmvp's MVD magnitude is {4-pel, 64-pel}.

In some embodiments, the combination of sbAmvp and AMVR mode is enabled for larger sequence resolution since the AMVR mode achieves higher gain for those sequences. For example, when the sequence resolution is larger than or equal to 720p (i.e., 1280×720), the combination of sbAmvp and AMVR mode is enabled. When a block is coded using the sbAmvp mode, a parameter is signaled to indicate the resolution of MVD magnitude. When the sequence resolution is smaller than 720p, the combination of sbAmvp and AMVR mode is disabled. The resolution of sbAmvp's MVD magnitude is always fixed to 4-pel.

According to some embodiments, the proposed sbAmvp mode can be combined with multi-hypothesis prediction (MHP) mode. In the ECM design, when a block is coded using bi-prediction mode with non-equal weights, the multi-hypothesis prediction (MHP) mode may be applied. One or two additional motion information is signaled to improve the prediction quality when MHP mode is applied.

In some embodiments, the MHP is applied to the sbAmvp mode. When a block is coded using sbAmvp mode, a flag is signaled to indicate whether the MHP is applied. When MHP is applied to the sbAmvp coded block, a first set of prediction samples are generated using the motion information of each subblock, and a second set of prediction samples are generated using the additional motion information. Then, the first and the second set of prediction samples are blending together.

Figure 31:
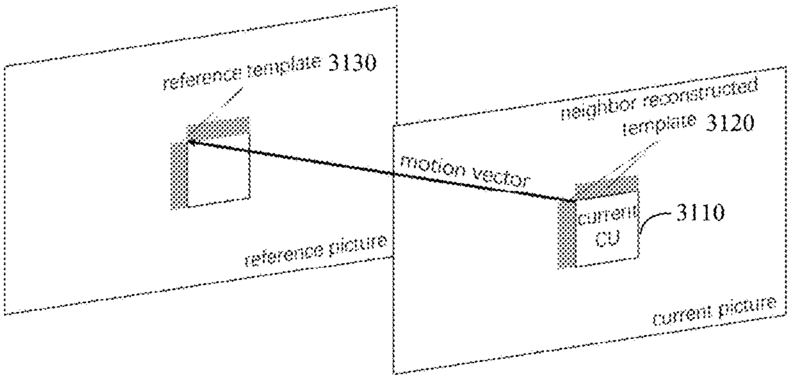
FIG. 31 illustrates an example process for derivation of $\alpha$ and $\beta$, according to some embodiments of the present disclosure.

According to some embodiments, the proposed sbAmvp mode can be combined with local illumination compensation (LIC). LIC is adopted in ECM to adjust the illumination changes between a reference picture and a current picture. The prediction samples of a LIC coded block are modified according to a linear equation, that is, $\alpha*p[x]+\beta$, wherein $\alpha$ is a scale, $\beta$ is an offset and $p[x]$ is the prediction sample. FIG. 31 illustrates an example process for derivation of $\alpha$ and $\beta$, according to some embodiments of the present disclosure. Referring to FIG. 31, the $\alpha$ and $\beta$ are derived using neighboring reconstructed template 3120 of the current CU 3110 and its corresponding reference template 3130.

Figure 32:
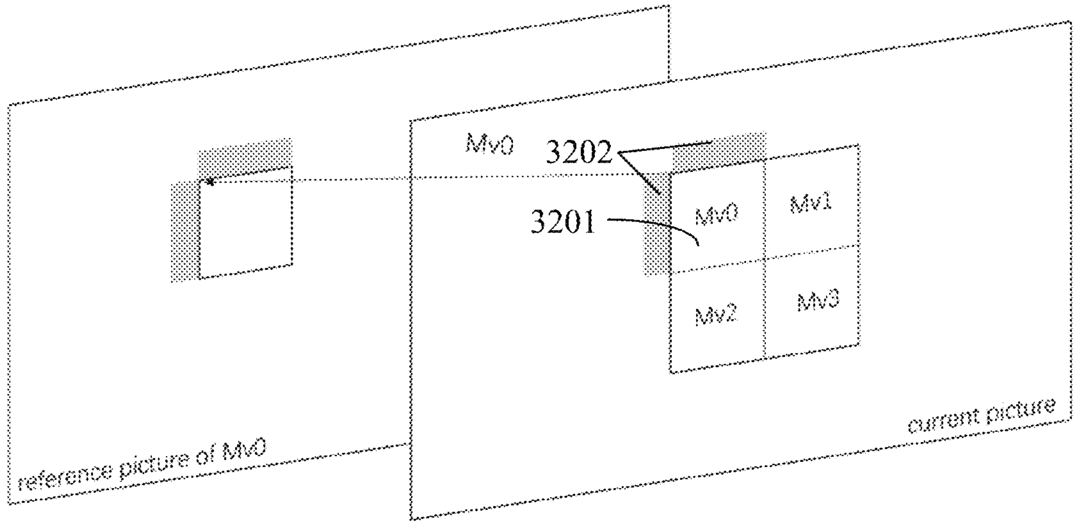
FIGS. 32-34 illustrate different LIC scales and offsets respectively, according to some embodiments of the present disclosure.
Figure 33:
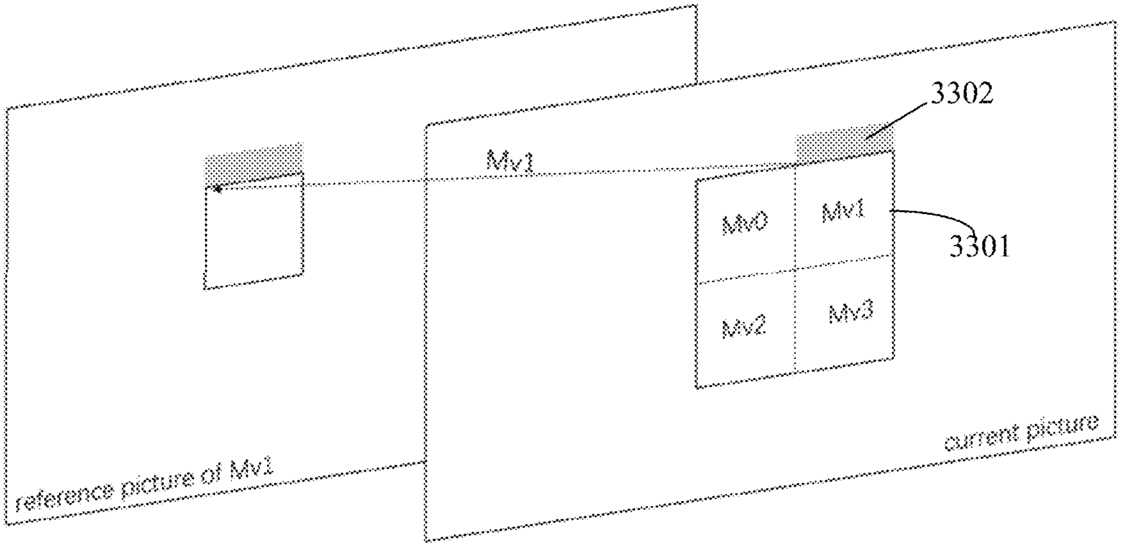
Figure 34:
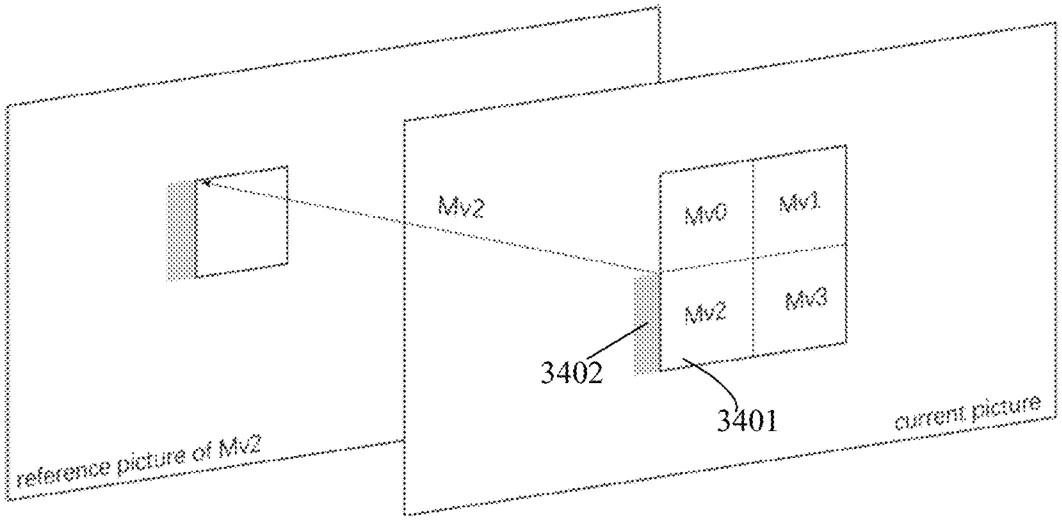

To adjust the illumination changes of the sbAmvp mode, the present disclosure proposes to apply LIC mode to sbAmvp. In some embodiments, a flag is signaled to indicate whether the LIC mode is applied to a sbAmvp coded block. When the LIC is applied, the linear equation is derived at subblock level. More specifically, in the sbAmvp mode, a block is split into multiple subblocks. Only the subblocks located at the CU boundary can be coded using the LIC mode. For each subblocks located at the CU boundary, the LIC scale and offset of the subblock are derived using its own neighboring reconstructed template and corresponding reference template of the subblock. That is, the LIC scale and offset for each subblock may be different from each other. FIGS. 32-34 illustrate different LIC scales and offsets respectively, according to some embodiments of the present disclosure. As shown in FIG. 32, for a top-left subblock 3201, the top and left reconstructed samples 3202 are used to derive LIC parameters. As shown in FIG. 33, for a top-right subblock 3301, only the top reconstructed samples 3302 are used since the left neighboring samples of the top-right subblock 3301 are not constructed yet. Similarly, as shown in FIG. 34, for a bottom-left subblock 3401, only the left reconstructed samples 3402 are used since the top neighboring samples of the bottom-left subblock 3401 are not constructed yet.

According to some embodiments, the merge mode with MVD (MMVD) can be applied to SbTMVP candidates. In the ECM, the merge mode with MVD (MMVD) is applied to affine merge candidates but not applied to SbTMVP candidates. In this disclosure, it is proposed to extend the MMVD to the SbTMVP mode.

In some embodiments, when a CU coded using SbTMVP with MMVD mode, an index is signaled to indicate the MVD. Then, the motion shift for SbTMVP mode is derived by adding the MVD to the motion derived from neighboring blocks, for example, a left neighboring block (e.g., A1 in FIG. 6).

It is noted that all the proposed methods can be combined freely.

In some embodiments, a non-transitory computer-readable storage medium storing a bitstream of a video is provided. The bitstream includes one or more syntax elements signaling the above-described coding unit (CU) level motion information. In some embodiments, the bitstream includes one or more syntax elements signaling parameters (e.g., flags or indices) included in the above proposed sbAmvp mode. In some embodiments, the bitstream includes one or more syntax elements signaling parameters (e.g., flags or indices) included in the above-described methods.

The embodiments may further be described using the following clauses:

1. A video decoding method using a subblock temporal motion prediction for regular inter mode (sbAmvp mode), comprising:

receiving a bitstream comprising one or more syntax elements signaling coding unit (CU) level motion information associated with a CU, wherein the CU is encoded using regular inter mode;

dividing the CU into a plurality of subblocks; and performing the sbAmvp mode on the plurality of subblocks, wherein performing the sbAmvp mode comprises:

deriving motion information for a subblock of the plurality of subblocks based on the signaled CU-level motion information.

2. The method according to clause 1, wherein the signaled CU-level motion information comprises one or more of an inter prediction direction (interDir), a reference picture index (refIdx), a motion vector predictor (MVP), or a motion vector differences (MVD).

3. The method according to clause 2, wherein deriving the motion information for the subblock is further based on a motion shift.

4. The method according to clause 3, wherein performing the sbAmvp mode further comprises:

obtaining a motion vector for a subblock based on the motion shift;

identifying a corresponding collocated subblock in a collocated picture for the subblock; and converting motion information of a corresponding collocated subblock to motion information of the subblock.

5. The method according to clause 4, wherein the signaled CU-level motion information contains MVP and MVD, and the MVP is pointed to a collocated reference picture, performing the sbAmvp mode further comprise:

determining the motion shift by adding the MVD to the MVP.

6. The method according to clause 4, wherein the signaled CU-level motion information only contains MVP, and the MVP is pointed to a collocated reference picture, and performing the sbAmvp mode further comprises:

setting the MVP as the motion shift.

7. The method according to clause 4, wherein the reference index of the subblock is selected from any one of reference pictures in a reference picture list.

8. The method according to clause 4, wherein the signaled CU-level motion information contains interDir, refIdx, MVP and MVD, and the MVP is pointed to a collocated reference picture, and performing the sbAmvp mode further comprise:

determining the motion shift by adding the MVD to the MVP; and determining the reference picture of the subblock using the interDir and refIdx.

9. The method according to clause 4, wherein the sbAmvp mode is combined with one or more of a local illumination compensation (LIC) mode, a multi-hypothesis prediction (MHP) mode, an overlapped block motion compensation (OBMC) mode, a bi-prediction with CU-level weight (BCW) mode, or an adaptive motion vector resolution (AMVR) mode.

10. The method according to clause 4, further comprising:

in response to an interDir not being signaled, determining the interDir to be the reference direction that contains the collocated picture.

11. The method according to clause 4, further comprising:

in response to the refIdx not being signaled, determining the refIdx to be an index of the collocated picture.

12. The method according to clause 3, further comprising:

determining a motion shift by adding the MVD to the MVP;

identifying the corresponding subblocks in a collocated picture with the motion shift; and converting motion information of the corresponding subblock to the motion information of the subblock.

13. The method according to clause 4, wherein before obtaining a motion vector for the subblock based on the motion shift, performing the sbAmvp mode further comprises:

identifying a corresponding collocated subblock in a collocated picture for the subblock;

determining whether motion information of the corresponding collocated subblock is available; and in response to the motion information of the corresponding collocated subblock is not available, determining whether motion information of a center subblock is available; and in response to the motion information of a center subblock is available, converting the motion information of the center subblock to motion information of the subblock.

14. The method according to clause 2, wherein deriving the motion information for the subblock is further based on a collocated block of the CU, wherein the collocated block is in a collocated picture.

15. The method according to clause 14, wherein performing the sbAmvp mode further comprises:

identifying a corresponding collocated subblock in the collocated picture for the subblock;

scaling motion information of the collocated subblock to a reference picture;

adding a scaled motion to a CU-level motion to obtain a motion of the subblock; and obtaining the motion information for the subblock comprising the motion of the subblock.

16. The method according to clause 15, wherein all the reference pictures of the plurality of subblocks are the same.
17. The method according to clause 16, wherein the signaled CU-level motion information comprises the interDir, the refIdx, the MVP, and the MVD, and performing the sbAmvp mode further comprises:
determining the reference picture using the refIdx of the CU-level motion information; and
determining the CU-level motion by adding the MVD to the MVP.
18. The method according to clause 16, wherein the signaled CU-level motion information contains interDir, MVP and MVD, and the signaled CU-level motion information is pointed to a pre-defined reference picture, performing the sbAmvp mode further comprises:
setting the reference picture to be the pre-defined reference picture; and
determining the CU-level motion by adding the MVD to the MVP.
19. The method according to clause 16, wherein the signaled CU-level motion information contains interDir, refIdx and MVP, the reference picture is determined using the refIdx; and performing the sbAmvp mode further comprises:
setting the CU-level motion to be the MVP.
20. The method according to clause 16, wherein the signaled CU-level motion information contains interDir and MVD, and performing the sbAmvp mode further comprises:
determining the reference picture and the MVP using a template matching (TM) cost; and
determining the CU-level motion by adding the MVD to the MVP.
21. The method according to clause 20, wherein the TM cost is calculated using a motion vector predictor candidate.
22. The method according to clause 20, wherein the TM cost is generated by a motion vector predictor candidate plus MVD.
23. The method according to clause 20, wherein the reference picture and the MVP of the signaled CU-level motion information is set to a picture with a minimum TM cost.
24. The method according to clause 15, wherein the reference pictures of the plurality of subblocks are different.
25. The method according to clause 24, wherein the signaled CU-level motion information contains interDir, refIdx, MVP and MVD, and performing the sbAmvp mode further comprise:
determining the motion information of the collocated subblock and the reference picture of each subblock, wherein the reference picture is selected from one of a plurality of reference pictures in a reference picture list, and the selected reference picture is the one whose scaling factor is the closest to 1; and
determining the CU-level motion by adding the MVD to the MVP.
26. The method according to clause 24, wherein the signaled CU-level motion information contains interDir, MVP and MVD, and the signaled CU-level motion information is pointed to a pre-defined reference picture, and performing the sbAmvp mode further comprises:
setting a collocated reference picture to be the pre-defined reference picture;
determining the motion information of the collocated subblock and a reference picture of each subblock, wherein the reference picture is selected from any one of reference pictures in a reference picture list, and the selected reference picture has a scaling factor closest to 1; and
determining the CU-level motion by adding the MVD to the MVP.
27. The method according to clause 26, wherein the pre-defined reference picture is signaled at slice-level, picture-level, PPS or SPS level.
28. The method according to clause 26, wherein the collocated subblock is coded using non-inter mode, and the motion information of the collocated subblock is selected from to one of zero motion, a motion of a center subblock of the CU, an averaged motion of a top subblock and a left subblock, an averaged motion of surrounding subblocks, or an averaged motion of the CU.
29. The method according to clause 28, wherein the average motion is obtained by scaling a motion of each subblock to a same reference picture, and the reference picture is indicated by the signaled CU-level motion information or is the collocated reference picture.
30. The method according to clause 28, wherein performing the sbAmvp mode further comprises determining the reference picture for subblocks using a refIdx of the signaled CU-level motion information;
determining the CU-level motion by adding the MVD to the MVP;
obtaining a scaled motion by scaling the motion information of the collocated subblock to the reference picture;
calculating an averaged motion of all the scaled motions;
obtaining a difference motion by subtracting the scaled motion with the averaged motion; and
adding the difference motion to the CU-level motion.
31. The method according to clause 1, wherein a slice header flag is signaled indicating whether the sbAmvp mode is enabled or disabled.
32. The method according to clause 1, wherein the sbAmvp mode is enabled or disabled for a current slice is determined according to an enabled area of the sbAmvp mode and a subblock-based temporal motion vector prediction (SbTMVP) mode in a previous decoded picture.
33. The method according to clause 32, further comprising:
determining whether the enabled area is larger than a pre-defined threshold; and
in response to the enabled area being larger than the pre-defined threshold, enabling the sbAmvp mode for the current slice; or
in response to the enabled area being equal to or smaller than the pre-defined threshold, disabling the sbAmvp mode for the current slice.
34. The method according to clause 33, wherein the pre-defined threshold is determined according to one or more of a quantization parameter (QP) of the current slice, a temporal layer of the current slice, and low delay condition.
35. The method according to clause 1, wherein when a width or height of a block is smaller than a first pre-defined positive value, the sbAmvp mode is disabled for the block.

36. The method according to clause 1, wherein when a width or a height of a block is larger than a second pre-defined positive value, the sbAmvp mode is disabled for the block.

37. The method according to clause 1, wherein a collocated picture for deriving the motion information for the subblock is an original collocated picture used in VVC.

38. The method according to clause 1, further comprising:

decoding a flag indicating a collocated picture for deriving the motion information for the subblock;

when the flag is equal to a first value, determining the collocated picture to be a first collocated picture used in VVC; and when the flag is equal to a second value, determining the collocated picture to a second collocated picture different from the first collocated picture.

39. The method according to clause 1, further comprising:

decoding a flag indicating which one of a first collocated picture used for VVC and a second collocated picture different from the first collocated picture is used for deriving the motion information for the subblock, wherein the first collocated picture and the second collocated picture are reordered based on a block level reference picture recoding method.

40. The method according to clause 1, further comprising:

deriving a first motion vector predictor of a first collocated picture used in Versatile Video Coding (VVC);

deriving a second motion vector predictor of a second collocated picture different from the first collocated picture;

calculating template matching (TM) costs of the first motion vector predictor and the second motion vector predictor respectively; and determining a collocated picture used for deriving the motion information for the subblock to be a corresponding collocated picture having a minimum TM cost.

41. The method according to clause 1, further comprising:

decoding a flag indicating an inter prediction direction of a block; and determining a collocated picture used for deriving the motion information for the subblock according to the inter prediction direction of the block.

42. The method according to clause 41, wherein the collocated picture is selected from a reference picture list that the inter prediction direction of the block pointed to.

43. The method according to clause 1, further comprising:

determining a number of collocated pictures according to whether a current picture is a low delay picture; and in response to the current picture being a low delay picture, determining the collocated pictures comprises a first collocated picture used in VVC and a second collocated picture different from the first collocated picture; and decoding a flag indicating which one of the collocated pictures is used for deriving the motion information for the subblock; or in response to the current picture not being a low delay picture, determining a collocated picture used for deriving the motion information for the subblock to be the first collocated picture used in VVC.

44. The method according to clause 1, further comprising:

identifying a reference index of the subblock from one of reference pictures in a reference picture list, wherein a selected reference picture has a scaling factor closest to 1; and performing a temporal motion scaling after the reference index is identified.

45. The method according to clause 44, wherein reference indices of the plurality of subblocks are different.

46. The method according to clause 1, wherein a reference index of the subblock within a CU is fixed.

47. The method according to clause 46, wherein the reference index is fixed to 0.

48. The method according to clause 46, further comprising:

determining a plurality of reference indices for the plurality of subblocks, one reference index for one subblock, wherein a scaling factor of the reference index is closest to 1;

constructing a histogram using the determined reference indices of the plurality of subblocks;

selecting a reference index with highest magnitude for all subblocks; and performing temporal motion scaling to scale all temporal motions of the plurality of subblocks to the selected reference index.

49. The method according to clause 1, wherein the sbAmvp mode is combined with adaptive motion vector resolution (AMVR) mode.

50. The method according to clause 49, wherein a resolution of MVD magnitude is {4-pel, 16-pel, 64-pel, 8-pel}.

51. The method according to clause 49, wherein the sbAmvp mode is combined with adaptive motion vector resolution (AMVR) mode, and a resolution of MVD magnitude is selected from one sub-set of {4-pel, 16-pel, 64-pel, 8-pel}.

52. The method according to clause 49, wherein whether to enable a combination of the sbAmvp mode and the AMVR mode is determined according to a sequence resolution.

53. The method according to clause 52, further comprising:

when the sequence resolution is larger than or equal to 720p, the combination of the sbAmvp mode and the AMVR mode is enabled, and decoding a parameter indicating a resolution of MVD magnitude; or when the sequence resolution is equal to or smaller than or equal to 720p, the combination of the sbAmvp mode and the AMVR mode is disabled, and the resolution of MVD magnitude is fixed to be 4-pel.

54. The method according to clause 1, wherein the sbAmvp mode is combined with multi-hypothesis prediction (MHP) mode.

55. The method according to clause 54, further comprising:

decoding a flag indicating whether the MHP mode is applied;

in response to the MHP mode is applied, generating a first set of prediction samples using the motion information of each subblock and a second set of prediction samples using additional motion information; and blending the first set of prediction samples and the second set of prediction samples.

56. The method according to clause 1, wherein the sbAmvp mode is combined with a local illumination compensation (LIC) mode.

57. The method according to clause 56, further comprising:

decoding a flag indicating whether the LIC is applied; and in response to the LIC is applied, deriving a linear equation at a subblock level, wherein the linear equation is $\alpha*p[x]+\beta$, wherein $\alpha$ is a scale, $\beta$ is an offset and p[x] is a prediction sample.

58. The method according to clause 56, wherein the LIC mode is applied on a subblock located at a CU boundary.

59. The method according to clause 58, wherein a LIC scale and an offset of the subblock are derived using a corresponding neighboring reconstructed template and a corresponding reference template of the subblock.

60. A method of decoding a bitstream to output one or more pictures for a video stream, the method comprising:

receiving a bitstream; and decoding, using coded information of the bitstream, one or more pictures, wherein the decoding comprising:

determining a number of motion magnitudes and a number of motion directions for the picture.

61. The method according to clause 60, wherein the number of motion magnitudes and the number of motion directions are determined according to whether a current picture is a low delay picture.

62. The method according to clause 61, wherein when the current picture is the low delay picture, 8 motion magnitudes with 2 sets of motion directions are used; and when the current picture is a non-low delay picture, 8 motion magnitudes with 8 fixed motion directions are used.

63. The method according to clause 60, wherein the number of motion magnitudes and the number of motion directions are determined according to a picture order count (POC) difference between a current picture and the corresponding collocated picture.

64. The method according to clause 63, wherein when the POC difference between the current picture and the corresponding collocated picture is larger than a positive integer value, 4 motion magnitudes with 2 sets of motion directions are used; and when the POC difference between the current picture and the corresponding collocated picture is equal to or smaller than the positive integer value, 8 motion magnitudes with 8 fixed motion directions are used.

65. The method according to clause 60, wherein the number of motion magnitudes and the number of motion directions are determined according to a temporal layer of a current picture.

66. The method according to clause 65, wherein when the temporal layer of the current picture is larger than a non-negative integer value, 4 motion magnitudes with 2 sets of motion directions are used; and when the temporal layer of the current picture is equal to or smaller than the non-negative integer value, 8 motion magnitudes with 8 fixed motion directions are used.

67. The method according to clause 60, wherein the number of motion magnitudes and the number of motion directions are determined according to a parity of POC number of a current picture.

68. The method according to clause 67, wherein when the POC of the current picture is an odd number, 4 motion magnitudes with 2 sets of motion directions are used; and when the POC of the current picture is an even number, 8 motion magnitudes with 8 fixed motion directions are used.

69. The method according to clause 60, wherein the number of motion magnitudes and the number of motion directions are determined according to a QP of a current picture.

70. The method according to clause 60, wherein the number of motion magnitudes and the number of motion directions are determined according to a POC difference between a current picture and a corresponding collocated picture of the current picture and whether the current picture is a low delay picture or not.

71. The method according to clause 70, further comprising:

determining whether POC difference between a current picture and a corresponding collocated picture of the current picture is greater than a positive integer;

in reposes to the POC difference between a current picture and the corresponding collocated picture is larger than the positive integer, 4 motion magnitudes with 2 sets of motion directions are used; and in reposes to the POC difference between a current picture and the corresponding collocated picture is equal to or smaller than the positive integer, determining whether the current picture is a low delay picture;

in response to the current picture is a low delay picture, 8 motion magnitudes with 2 sets of motion directions are used; and in response to the current picture is a non-low delay picture, 8 motion magnitudes with 8 fixed motion directions are used.

72. The method according to clause 60, wherein the number of motion magnitudes and the number of motion directions are determined according to a temporal layer of a current picture and whether the current picture is a low delay picture or not.

73. The method according to clause 72, further comprising:

determining whether the current picture is a low delay picture;

in response to the current picture being a low delay picture, 8 motion magnitudes with 2 sets of motion directions are used; or in response to the current picture not being a low delay picture, determining whether the temporal layer of the current picture is larger than a non-negative integer;

in response to the temporal layer of the current picture being larger than a non-negative integer, 4 motion magnitudes with 2 sets of motion directions are used; and in response to the temporal layer of the current picture being equal to or smaller than a non-negative integer, 8 motion magnitudes with 8 fixed motion directions are used.

74. The method according to clause 60, further comprising:

decoding a first flag indicating the number of motion magnitudes; and decoding a second flag indicating the number of motion directions.

75. The method according to clause 74, wherein the first flag indicates whether the number of motion magnitudes is equal to 4 or 8, and the second flag indicates whether the number of motion directions is fixed to 8 or is adaptively switching between two sets of motion direction.

76. The method according to clause 60, further comprising:

decoding a first flag indicating whether 8 motion magnitudes with 8 fixed motion directions are used; and in response to the 8 motion magnitudes with 8 fixed motion directions are not used, decoding a second flag indicating which one of 4 motion magnitudes with 2 sets of motion directions or 8 motion magnitudes with 2 sets of motion directions is used.

77. The method according to clause 76, wherein the first flag and the second flag are signaled for non-low delay pictures.

78. The method according to clause 60, wherein 8 motion magnitudes with 2 sets of motion directions are used for low-delay pictures.

79. A video decoding method, comprising:

decoding an index indicating motion vector differences (MVD); and deriving a motions shift for subblock-based temporal motion vector prediction (SbTMVP) mode by adding the MVD to a motion derived from neighboring blocks.

80. A video encoding method using a subblock temporal motion prediction for regular inter mode (sbAmvp mode), comprising:

receiving a video sequence;

encoding one or more pictures of the video sequence; and generating a bitstream; wherein the encoding comprising:

encoding a coding unit (CU) using regular inter mode;

signaling CU-level motion information associated with the CU;

dividing the CU into a plurality of subblocks; and performing the sbAmvp mode on the plurality of subblocks, wherein performing the sbAmvp mode comprises:

deriving motion information for a subblock of the plurality of subblocks based on the signaled CU-level motion information.

81. The method according to clause 80, wherein the signaled CU-level motion information comprises one or more of an inter prediction direction (interDir), a reference picture index (refIdx), a motion vector predictor (MVP), or a motion vector differences (MVD).

82. The method according to clause 81, wherein deriving the motion information for the subblock is further based on a motion shift.

83. The method according to clause 82, wherein performing the sbAmvp mode further comprises:

obtaining a motion vector for a subblock based on the motion shift;

identifying a corresponding collocated subblock in a collocated picture for the subblock; and converting motion information of a corresponding collocated subblock to motion information of the subblock.

84. The method according to clause 83, wherein the signaled CU-level motion information contains MVP and MVD, and the MVP is pointed to a collocated reference picture, performing the sbAmvp mode further comprise:

determining the motion shift by adding the MVD to the MVP.

85. The method according to clause 83, wherein the signaled CU-level motion information only contains MVP, and the MVP is pointed to a collocated reference picture, and performing the sbAmvp mode further comprises:

setting the MVP as the motion shift.

86. The method according to clause 83, wherein the reference index of the subblock is selected from any one of reference pictures in a reference picture list.

87. The method according to clause 83, wherein the signaled CU-level motion information contains interDir, refIdx, MVP and MVD, and the MVP is pointed to a collocated reference picture, and performing the sbAmvp mode further comprise:

determining the motion shift by adding the MVD to the MVP; and determining the reference picture of the subblock using the interDir and refIdx. 88. The method according to clause 83, wherein the sbAmvp mode is combined with one or more of a local illumination compensation (LIC) mode, a multi-hypothesis prediction (MIP) mode, an overlapped block motion compensation (OBMC) mode, a bi-prediction with CU-level weight (BCW) mode, or an adaptive motion vector resolution (AMVR) mode.

89. The method according to clause 83, further comprising:

in response to an interDir not being signaled, determining the interDir to be the reference direction that contains the collocated picture.

90. The method according to clause 83, further comprising:

in response to the refIdx not being signaled, determining the refIdx to be an index of the collocated picture.

91. The method according to clause 82, further comprising:

determining a motion shift by adding the MVD to the MVP;

identifying the corresponding subblocks in a collocated picture with the motion shift; and converting motion information of the corresponding subblock to the motion information of the subblock.

92. The method according to clause 83, wherein before obtaining a motion vector for the subblock based on the motion shift, performing the sbAmvp mode further comprises:

identifying a corresponding collocated subblock in a collocated picture for the subblock;

determining whether motion information of the corresponding collocated subblock is available; and in response to the motion information of the corresponding collocated subblock is not available, determining whether motion information of a center subblock is available; and in response to the motion information of a center subblock is available, converting the motion information of the center subblock to motion information of the subblock.

93. A non-transitory computer readable storage medium storing a bitstream generated by operations comprising:

encoding a coding unit (CU) using regular inter mode;

signaling CU-level motion information associated with the CU;

dividing the CU into a plurality of subblocks; and performing the sbAmvp mode on the plurality of subblocks, wherein performing the sbAmvp mode comprises:

deriving motion information for a subblock of the plurality of subblocks based on the signaled CU-level motion information.

94. The non-transitory computer readable storage medium according to 93, wherein the signaled CU-level motion information comprises one or more of an inter prediction direction (interDir), a reference picture index (refIdx), a motion vector predictor (MVP), or a motion vector differences (MVD).

95. The non-transitory computer readable storage medium according to clause 94, wherein deriving the motion information for the subblock is further based on a motion shift.

96. The non-transitory computer readable storage medium according to clause 95, wherein performing the sbAmvp mode further comprises:

obtaining a motion vector for a subblock based on the motion shift;

identifying a corresponding collocated subblock in a collocated picture for the subblock; and converting motion information of a corresponding collocated subblock to motion information of the subblock.

97. The non-transitory computer readable storage medium according to clause 96, wherein the signaled CU-level motion information contains MVP and MVD, and the MVP is pointed to a collocated reference picture, performing the sbAmvp mode further comprise:

determining the motion shift by adding the MVD to the MVP.

98. The non-transitory computer readable storage medium according to clause 96, wherein the signaled CU-level motion information only contains MVP, and the MVP is pointed to a collocated reference picture, and performing the sbAmvp mode further comprises:

setting the MVP as the motion shift.

99. The non-transitory computer readable storage medium according to clause 96, wherein the reference index of the subblock is selected from any one of reference pictures in a reference picture list.

100. The non-transitory computer readable storage medium according to clause 96, wherein the signaled CU-level motion information contains interDir, refIdx, MVP and MVD, and the MVP is pointed to a collocated reference picture, and performing the sbAmvp mode further comprise:

determining the motion shift by adding the MVD to the MVP; and determining the reference picture of the subblock using the interDir and refIdx.

101. The non-transitory computer readable storage medium according to clause 83, wherein the sbAmvp mode is combined with one or more of a local illumination compensation (LIC) mode, a multi-hypothesis prediction (MHP) mode, an overlapped block motion compensation (OBMC) mode, a bi-prediction with CU-level weight (BCW) mode, or an adaptive motion vector resolution (AMVR) mode.

102. The non-transitory computer readable storage medium according to clause 96, wherein the operations further comprise:

in response to an interDir not being signaled, determining the interDir to be the reference direction that contains the collocated picture.

103. The non-transitory computer readable storage medium according to clause 96, wherein the operations further comprise:

in response to the refIdx not being signaled, determining the refIdx to be an index of the collocated picture.

104. The non-transitory computer readable storage medium according to clause 95, wherein the operations further comprise:

determining a motion shift by adding the MVD to the MVP;

identifying the corresponding subblocks in a collocated picture with the motion shift; and converting motion information of the corresponding subblock to the motion information of the subblock.

105. The non-transitory computer readable storage medium according to clause 96, wherein before obtaining a motion vector for the subblock based on the motion shift, performing the sbAmvp mode further comprises:

identifying a corresponding collocated subblock in a collocated picture for the subblock;

determining whether motion information of the corresponding collocated subblock is available; and in response to the motion information of the corresponding collocated subblock is not available, determining whether motion information of a center subblock is available; and in response to the motion information of a center subblock is available, converting the motion information of the center subblock to motion information of the subblock.

106. A video encoding method comprising:

receiving a video sequence;

encoding one or more pictures of the video sequence; and generating a bitstream; wherein the encoding comprising:

determining a number of motion magnitudes and a number of motion directions for the picture.

107. A non-transitory computer readable storage medium storing a bitstream generated by operations comprising:

determining a number of motion magnitudes and a number of motion directions for the picture.

108. A video encoding method comprising:

receiving a video sequence;

encoding one or more pictures of the video sequence; and generating a bitstream; wherein the encoding comprising:

deriving a motions shift for subblock-based temporal motion vector prediction (SbTMVP) mode by adding motion vector differences (MVD) to a motion derived from left neighboring blocks; and encoding an index indicating the MVD.

109. A non-transitory computer readable storage medium storing a bitstream generated by operations comprising:

deriving a motions shift for subblock-based temporal motion vector prediction (SbTMVP) mode by adding motion vector differences (MVD) to a motion derived from left neighboring blocks; and encoding an index indicating the MVD.

In some embodiments, a non-transitory computer-readable storage medium is also provided. In some embodiments, the medium can store all or portions of the video bitstream having one or more flags that indicate resampling applied, such as the temporal resampling and the spatial resampling. In some embodiments, the medium can store all or portions of the video bitstream having an index that indicates a resampling factor. In some embodiments, the medium can store instructions that may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It should be noted that, the relational terms herein such as “first” and “second” are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video decoding method using a motion prediction for regular inter mode (sbAmvp mode), comprising:

receiving a bitstream comprising one or more syntax elements signaling coding unit (CU) level motion information associated with a CU, wherein the CU is encoded using regular inter mode;

dividing the CU into a plurality of subblocks; and performing the sbAmvp mode on the plurality of subblocks, wherein performing the sbAmvp mode comprises:

deriving motion information for a subblock of the plurality of subblocks based on the signaled CU-level motion information;

identifying a corresponding collocated subblock in a collocated picture for the subblock;

determining whether motion information of the corresponding collocated subblock is available;

in response to the motion information of the corresponding collocated subblock is not available, determining whether motion information of a center subblock is available; and in response to the motion information of the center subblock is unavailable, deriving the motion information for the subblock based on a motion shift.

2. The method according to claim 1, wherein the signaled CU-level motion information comprises one or more of an inter prediction direction (interDir), a reference picture index (refIdx), a motion vector predictor (MVP), or a motion vector differences (MVD).

3. The method according to claim 2, wherein the refIdx of the subblock is selected from any one of reference pictures in a reference picture list.

4. The method according to claim 2, wherein the signaled CU-level motion information contains interDir, refIdx, MVP and MVD, and the MVP is pointed to a collocated reference picture, and performing the sbAmvp mode further comprise:

determining the motion shift by adding the MVD to the MVP; and determining the reference picture of the subblock using the interDir and refIdx.

5. The method according to claim 1, wherein the sbAmvp mode is combined with one or more of a local illumination compensation (LIC) mode, a multi-hypothesis prediction (MHP) mode, an overlapped block motion compensation (OBMC) mode, a bi-prediction with CU-level weight (BCW) mode, or an adaptive motion vector resolution (AMVR) mode.

6. The method according to claim 2, further comprising:

in response to the interDir not being signaled, determining the interDir to be a reference direction that contains the collocated picture.

7. The method according to claim 2, further comprising:

in response to the refIdx not being signaled, determining the refIdx to be an index of the collocated picture.

8. A video encoding method using a subblock temporal motion prediction for regular inter mode (sbAmvp mode), comprising:

receiving a video sequence;

encoding one or more pictures of the video sequence; and generating a bitstream; wherein the encoding comprising:

encoding a coding unit (CU) using regular inter mode;

signaling CU-level motion information associated with the CU;

dividing the CU into a plurality of subblocks; and performing the sbAmvp mode on the plurality of subblocks, wherein performing the sbAmvp mode comprises:

deriving motion information for a subblock of the plurality of subblocks based on the signaled CU-level motion information, identifying a corresponding collocated subblock in a collocated picture for the subblock;

determining whether motion information of the corresponding collocated subblock is available;

in response to the motion information of the corresponding collocated subblock is not available, determining whether motion information of a center subblock is available; and in response to the motion information of the center subblock is unavailable, deriving the motion information for the subblock based on a motion shift.

9. The method according to claim 8, wherein the signaled CU-level motion information comprises one or more of an inter prediction direction (interDir), a reference picture index (refIdx), a motion vector predictor (MVP), or a motion vector differences (MVD).

10. The method according to claim 9, wherein the refIdx of the subblock is selected from any one of reference pictures in a reference picture list.

11. The method according to claim 9, wherein the signaled CU-level motion information contains interDir, refIdx, MVP and MVD, and the MVP is pointed to a collocated reference picture, and performing the sbAmvp mode further comprise:

determining the motion shift by adding the MVD to the MVP; and determining the reference picture of the subblock using the interDir and refIdx.

12. The method according to claim 8, wherein the sbAmvp mode is combined with one or more of a local illumination compensation (LIC) mode, a multi-hypothesis prediction (MHP) mode, an overlapped block motion compensation (OBMC) mode, a bi-prediction with CU-level weight (BCW) mode, or an adaptive motion vector resolution (AMVR) mode.

13. The method according to claim 9, further comprising:

in response to the interDir not being signaled, determining the interDir to be the refIdx that contains the collocated picture.

14. The method according to claim 9, further comprising:

in response to the refIdx not being signaled, determining the refIdx to be an index of the collocated picture.

15. A method for signaling a bitstream, the method comprising:

receiving a video sequence;

encoding the video sequence by:

encoding a coding unit (CU) using regular inter mode;

signaling CU-level motion information associated with the CU;

dividing the CU into a plurality of subblocks; and performing a subblock temporal motion prediction for regular inter mode (sbAmvp mode) on the plurality of subblocks, wherein performing the sbAmvp mode comprises:

deriving motion information for a subblock of the plurality of subblocks based on the signaled CU-level motion information;

identifying a corresponding collocated subblock in a collocated picture for the subblock;

determining whether motion information of the corresponding collocated subblock is available;

in response to the motion information of the corresponding collocated subblock is not available, determining whether motion information of a center subblock is available; and in response to the motion information of the center subblock is unavailable, deriving the motion information for the subblock based on a motion shift; and signaling the bitstream that is generated based on the encoding.

16. The method according to claim 15, wherein the signaled CU-level motion information comprises one or more of an inter prediction direction (interDir), a reference picture index (refIdx), a motion vector predictor (MVP), or a motion vector differences (MVD).

17. The method according to claim 16, wherein the refIdx of the subblock is selected from any one of reference pictures in a reference picture list.

18. The method according to claim 16, wherein the signaled CU-level motion information contains interDir, refIdx, MVP and MVD, and the MVP is pointed to a collocated reference picture, and performing the sbAmvp mode further comprise:

determining the motion shift by adding the MVD to the MVP; and determining the reference picture of the subblock using the interDir and refIdx.

19. The method according to claim 15, wherein the sbAmvp mode is combined with one or more of a local illumination compensation (LIC) mode, a multi-hypothesis prediction (MHP) mode, an overlapped block motion compensation (OBMC) mode, a bi-prediction with CU-level weight (BCW) mode, or an adaptive motion vector resolution (AMVR) mode.

20. The method according to claim 16, wherein in response to the interDir not being signaled, determining the interDir to be a reference direction that contains the collocated picture; or in response to the refIdx not being signaled, determining the refIdx to be an index of the collocated picture.

* * * * *